United States Patent
Lyu et al.

(10) Patent No.: US 12,245,294 B2
(45) Date of Patent: Mar. 4, 2025

(54) METHOD FOR NODE USED FOR WIRELESS COMMUNICATION AND APPARATUS

(71) Applicant: QUECTEL WIRELESS SOLUTIONS CO., LTD., Shanghai (CN)

(72) Inventors: Ling Lyu, Shanghai (CN); Zheng Zhao, Shanghai (CN); Zhongzhi Yang, Shanghai (CN)

(73) Assignee: Quectel Wireless Solutions Co., Ltd., Shanghai (CN)

( * ) Notice: Subject to any disclaimer, the term of this patent is extended or adjusted under 35 U.S.C. 154(b) by 0 days.

(21) Appl. No.: 18/731,200

(22) Filed: May 31, 2024

(65) Prior Publication Data

US 2024/0381441 A1 Nov. 14, 2024

Related U.S. Application Data

(63) Continuation of application No. PCT/CN2023/093853, filed on May 12, 2023.

(51) Int. Cl.
*H04W 74/0833* (2024.01)
*H04W 74/00* (2009.01)

(52) U.S. Cl.
CPC ..... *H04W 74/0833* (2013.01); *H04W 74/006* (2013.01)

(58) Field of Classification Search
CPC .............. H04W 74/0833; H04W 74/006
See application file for complete search history.

(56) References Cited

U.S. PATENT DOCUMENTS

| | | | |
|---|---|---|---|
| 11,057,940 B2 * | 7/2021 | Agiwal | H04W 76/27 |
| 2020/0137806 A1 * | 4/2020 | Islam | H04B 7/0408 |
| 2021/0029738 A1 | 1/2021 | Zhou et al. | |
| 2021/0084690 A1 * | 3/2021 | Ye | H04W 74/0833 |
| 2022/0109540 A1 * | 4/2022 | Cozzo | H04L 5/0094 |
| 2022/0312487 A1 | 9/2022 | Zhang et al. | |

(Continued)

FOREIGN PATENT DOCUMENTS

| | | |
|---|---|---|
| CN | 109997405 A | 7/2019 |
| CN | 111727655 A | 9/2020 |

(Continued)

OTHER PUBLICATIONS

3GPP TS 38.321 V17.4.0, "3rd Generation Partnership Project; Technical Specification Group Radio Access Network; NR; Medium Access Control (MAC) protocol specification (Release 17)," Mar. 2023, 252 pages.

(Continued)

*Primary Examiner* — Siren Wei

(74) *Attorney, Agent, or Firm* — Fish & Richardson P.C.

(57) ABSTRACT

Provided are a method for a node used for wireless communication and an apparatus. One example method includes: receiving first signaling, wherein the first signaling indicates a plurality of physical random access channel occasion groups, and each of the plurality of physical random access channel occasion groups comprises a plurality of physical random access channel occasions; and receiving second signaling, wherein the second signaling indicates a value of a first index, and the value of the first index corresponds to at least one corresponding physical random access channel occasion group of the plurality of physical random access channel occasion groups.

20 Claims, 6 Drawing Sheets

(56) References Cited

U.S. PATENT DOCUMENTS

| | | | | |
|---|---|---|---|---|
| 2023/0199856 | A1* | 6/2023 | Guo | H04W 74/0833 370/329 |
| 2023/0262767 | A1* | 8/2023 | Park | H04W 72/23 370/329 |

FOREIGN PATENT DOCUMENTS

| | | |
|---|---|---|
| CN | 111788861 A | 10/2020 |
| CN | 112788762 A | 5/2021 |
| CN | 114128388 A | 3/2022 |
| CN | 114430926 A | 5/2022 |
| CN | 115211219 | 10/2022 |
| CN | 115734365 | 3/2023 |
| CN | 115734365 A | 3/2023 |
| WO | WO 2020129784 | 6/2020 |
| WO | WO 2021092847 | 5/2021 |

OTHER PUBLICATIONS

China Telecom, "Revised WID on Further NR coverage enhancements," 3GPP TSG RAN Meeting #96, RP-221858, Budapest, Hungary, Jun. 6-9, 2022, 5 pages.

International Search Report and Written Opinion in International Appln. No. PCT/CN2023/093853, mailed on Nov. 17, 2023, 12 pages (with English translation).

LG Electronics, "Discussion on coverage enhancement for NR NTN," 3GPP TSG RAN WG1 #112, R1-2301072, Athens, Greece, Feb. 27-Mar. 3, 2023, 11 pages.

China Telecom, "Discussion on PRACH coverage enhancement," 3GPP TSG RAN WG1 #112bis-e, R1-2303034, e-Meeting, Apr. 17-26, 2023, 14 pages.

Huawei et al., "Discussion on PRACH coverage enhancements," 3GPP TSG-RAN WG1 Meeting #112bis-e, R1-2302350, e-Meeting, Apr. 17-26, 2023, 19 pages.

Notice of Allowances in Chinese Appln. No. 202380010764.6, mailed on Jul. 17, 2024, 6 pages (with English machine translation).

Office Action in Chinese Appln. No. 202380010764.6, mailed on Apr. 27, 2024, 27 pages (with English machine translation).

OPPO, "PRACH coverage enhancements," 3GPP TSG RAN WG1 #112bis-e, R1-2302573, e-Meeting, Apr. 17-26, 2023, 6 pages.

Quectel, "Discussion on PRACH coverage enhancements," 3GPP TSG RAN WG1 #112bis-e, R1-2303209, e-Meeting, Apr. 17-26, 2023, 5 pages.

Office Action in Chinese Appln. No. 202411176544.3, mailed on Dec. 21, 2024, 22 pages (with English machine translation).

* cited by examiner

| PRACH mask indicator field | Allowed ROG(s) associated with SS/PBCH block |
|---|---|
| 0 | All ROGs |
| 1 | ROG index 1 |
| 2 | ROG index 2 |
| 3 | ROG index 3 |
| 4 | ROG index 4 |
| 5 | ROG index 5 |
| 6 | ROG index 6 |
| 7 | ROG index 7 |
| 8 | ROG index 8 |
| 9 | Every even ROG (Every even ROG) |
| 10 | Every odd ROG (Every odd ROG) |
| 11 | Reserved value(Reserved) |
| 12 | Reserved value |
| 13 | Reserved value |
| 14 | Reserved value |
| 15 | Reserved value |

FIG. 5

| PRACH mask indicator field | Allowed ROs associated with SS/PBCH block |
|---|---|
| 0 | RO index 1, 2 ROs |
| 1 | RO index 1, 4 ROs |
| 2 | RO index 1, 8 ROs |
| 3 | RO index 2, 2 ROs |
| 4 | RO index 2, 4 ROs |
| 5 | RO index 2, 8 ROs |
| 6 | RO index 3, 2 ROs |
| 7 | RO index 3, 4 ROs |
| 8 | RO index 3, 8 ROs |
| 9 | RO index 4, 2 ROs |
| 10 | RO index 4, 4 ROs |
| 11 | RO index 4, 8 ROs |
| 12 | RO index 5, 2 ROs |
| 13 | RO index 5, 4 ROs |
| 14 | RO index 5, 8 ROs |
| 15 | Reserved value |

FIG. 6

| PRACH mask indicator field | Allowed ROs associated with SS/PBCH block |
|---|---|
| 0 | ROG(s) with 2 ROs |
| 1 | ROG(s) with 4 ROs |
| 2 | ROG(s) with 8 ROs |
| 3 | Reserved value |
| 4 | Reserved value |
| 5 | Reserved value |
| 6 | Reserved value |
| 7 | Reserved value |
| 8 | Reserved value |
| 9 | Reserved value |
| 10 | Reserved value |
| 11 | Reserved value |
| 12 | Reserved value |
| 13 | Reserved value |
| 14 | Reserved value |
| 15 | Reserved value |

FIG. 7

| PRACH mask indicator field | Allowed ROG(s)/ROs associated with SS/PBCH block |
|---|---|
| 0 | All ROGs |
| 1 | ROG index 1, RO index 1, 2 ROs |
| 2 | ROG index 1, RO index 2, 4 ROs |
| 3 | ROG index 1, RO index 3, 8 ROs |
| 4 | ROG index 2, RO index 1, 2 ROs |
| 5 | ROG index 2, RO index 2, 4 ROs |
| 6 | ROG index 2, RO index 3, 8 ROs |
| 7 | ROG index 3, RO index 1, 2 ROs |
| 8 | ROG index 3, RO index 2, 4 ROs |
| 9 | ROG index 3, RO index 3, 8 ROs |
| 10 | ROG index 4, RO index 1, 2 ROs |
| 11 | ROG index 4, RO index 2, 4 ROs |
| 12 | ROG index 4, RO index 3, 8 ROs |
| 13 | Reserved value |
| 14 | Reserved value |
| 15 | Reserved value |

FIG. 8

| PRACH mask indicator field | Forbidden ROG(s) associated with SS/PBCH block |
|---|---|
| 0 | All ROGs |
| 1 | ROG index 1 |
| 2 | ROG index 2 |
| 3 | ROG index 3 |
| 4 | ROG index 4 |
| 5 | ROG index 5 |
| 6 | ROG index 6 |
| 7 | ROG index 7 |
| 8 | ROG index 8 |
| 9 | Every even ROG |
| 10 | Every odd ROG |
| 11 | Reserved value |
| 12 | Reserved value |
| 13 | Reserved value |
| 14 | Reserved value |
| 15 | Reserved value |

FIG. 9

| PRACH mask indicator field | ROGs associated with SS/PBCH block |
|---|---|
| 0 | All ROGs (allowed) |
| 1 | ROG index 1 (allowed) |
| 2 | ROG index 2 (allowed) |
| 3 | ROG index 3 (allowed) |
| 4 | ROG index 4 (allowed) |
| 5 | RO index 1, X1 ROs (allowed) |
| 6 | RO index 1, X2 ROs (allowed) |
| 7 | RO index 2, X1 ROs (allowed) |
| 8 | RO index 2, X2 ROs (allowed) |
| 9 | X1 ROs (allowed) |
| 10 | X2 ROs (allowed) |
| 11 | ROG index 1 (forbidden) |
| 12 | ROG index 2 (forbidden) |
| 13 | RO index 1, X1 ROs (forbidden) |
| 14 | RO index 1, X2 ROs (forbidden) |
| 15 | X3 ROs (forbidden) |

FIG. 10

METHOD FOR NODE USED FOR WIRELESS COMMUNICATION AND APPARATUS

CROSS-REFERENCE TO RELATED APPLICATIONS

This application is a continuation of International Application No. PCT/CN2023/093853, filed on May 12, 2023, the disclosure of which is hereby incorporated by reference in its entirety.

TECHNICAL FIELD

The present application relates to the field of communications technologies, and more specifically, to a method for a node used for wireless communication and an apparatus.

BACKGROUND

In order to enhance coverage performance of a physical random access channel (PRACH), some communication systems (such as new radio (NR) systems) plan to introduce a solution of multiple PRACH transmissions. In the solution of multiple PRACH transmissions, a plurality of PRACHs can be transmitted on a physical random access channel occasion group (ROG). In this case, how to determine a ROG corresponding to the multiple PRACH transmissions is a problem that needs to be resolved.

SUMMARY

Embodiments of the present application provide a method for a node used for wireless communication and an apparatus. Various aspects used in the present application are described below.

According to a first aspect, a first node used for wireless communication is provided, including: a first receiving set, receiving first signaling, where the first signaling is used to determine a plurality of physical random access channel occasion groups, and each of the plurality of physical random access channel occasion groups includes a plurality of physical random access channel occasions; and a second receiving set, receiving second signaling, where the second signaling is used to indicate a value of a first index, and the value of the first index corresponds to at least one physical random access channel occasion group of the plurality of physical random access channel occasion groups.

In an implementation, the first node includes: a first transmitting set, transmitting a plurality of physical random access channels on a target physical random access channel occasion group; where the target physical random access channel occasion group is one of the at least one physical random access channel occasion group corresponding to the value of the first index.

In an implementation, the first node includes: a first transmitting set, transmitting a plurality of physical random access channels on a target physical random access channel occasion group; where the target physical random access channel occasion group is a physical random access channel occasion group, other than the at least one physical random access channel occasion group corresponding to the value of the first index, in the plurality of physical random access channel occasion groups determined by the first signaling.

In an implementation, the value of the first index is one of a plurality of non-negative integers, and the plurality of non-negative integers are in a one-to-one correspondence with a plurality of physical random access channel occasion group subsets; and each of the plurality of physical random access channel occasion group subsets includes at least one physical random access channel occasion group of the plurality of physical random access channel occasion groups.

In an implementation, at least one physical random access channel occasion group included in at least one physical random access channel occasion group subset of the plurality of physical random access channel occasion group subsets is allowed to be used for multiple physical random access channel transmissions.

In an implementation, at least one physical random access channel occasion group included in at least one physical random access channel occasion group subset of the plurality of physical random access channel occasion group subsets is forbidden to be used for multiple physical random access channel transmissions.

In an implementation, third signaling is used to configure a correspondence between the plurality of non-negative integers and the plurality of physical random access channel occasion group subsets.

In an implementation, the at least one physical random access channel occasion group corresponding to the value of the first index is associated with a same synchronization signal/physical broadcast channel block index.

In an implementation, the value of the first index corresponds to a first physical random access channel occasion group index, and the first physical random access channel occasion group index is used to determine a first physical random access channel occasion group from the plurality of physical random access channel occasion groups.

In an implementation, the value of the first index corresponds to a first occasion number, and a number of physical random access channel occasions included in at least one physical random access channel occasion group of the plurality of physical random access channel occasion groups is equal to the first occasion number.

In an implementation, the value of the first index corresponds to a first physical random access channel occasion index, the first physical random access channel occasion index is used to determine a first physical random access channel occasion from a plurality of physical random access channel occasions included in the plurality of physical random access channel occasion groups, and each of the plurality of physical random access channel occasions included in the plurality of physical random access channel occasion groups belongs to one of the plurality of physical random access channel occasion groups.

In an implementation, the second signaling includes a plurality of indication fields, and at least one of the plurality of indication fields is used to indicate the value of the first index.

In an implementation, the plurality of indication fields include at least two of following: an uplink/supplementary uplink indication field, a synchronization signal/physical broadcast channel block index field, a first index field, and a reserved bits field; where the first index field is used to indicate at least one physical random access channel occasion group of the plurality of physical random access channel occasion groups; or the synchronization signal/physical broadcast channel block index field and the first index field are jointly used to indicate at least one physical random access channel occasion group of the plurality of physical random access channel occasion groups.

According to a second aspect, a second node used for wireless communication is provided, including: a first transmitting set, transmitting first signaling, where the first signaling is used to determine a plurality of physical random access channel occasion groups, and each of the plurality of physical random access channel occasion groups includes a plurality of physical random access channel occasions; and a second transmitting set, transmitting second signaling, where the second signaling is used to indicate a value of a first index, and the value of the first index corresponds to at least one physical random access channel occasion group of the plurality of physical random access channel occasion groups.

In an implementation, the second node includes: a first receiving set, receiving a plurality of physical random access channels, where the plurality of physical random access channels are transmitted on a target physical random access channel occasion group; where the target physical random access channel occasion group is one of the at least one physical random access channel occasion group corresponding to the value of the first index.

In an implementation, the second node includes: a first receiving set, receiving a plurality of physical random access channels, where the plurality of physical random access channels are transmitted on a target physical random access channel occasion group; where the target physical random access channel occasion group is a physical random access channel occasion group, other than the at least one physical random access channel occasion group corresponding to the value of the first index, in the plurality of physical random access channel occasion groups determined by the first signaling.

In an implementation, the value of the first index is one of a plurality of non-negative integers, and the plurality of non-negative integers are in a one-to-one correspondence with a plurality of physical random access channel occasion group subsets; and each of the plurality of physical random access channel occasion group subsets includes at least one physical random access channel occasion group of the plurality of physical random access channel occasion groups.

In an implementation, at least one physical random access channel occasion group included in at least one physical random access channel occasion group subset of the plurality of physical random access channel occasion group subsets is allowed to be used for multiple physical random access channel transmissions.

In an implementation, at least one physical random access channel occasion group included in at least one physical random access channel occasion group subset of the plurality of physical random access channel occasion group subsets is forbidden to be used for multiple physical random access channel transmissions.

In an implementation, third signaling is used to configure a correspondence between the plurality of non-negative integers and the plurality of physical random access channel occasion group subsets.

In an implementation, the at least one physical random access channel occasion group corresponding to the value of the first index is associated with a same synchronization signal/physical broadcast channel block index.

In an implementation, the value of the first index corresponds to a first physical random access channel occasion group index, and the first physical random access channel occasion group index is used to determine a first physical random access channel occasion group from the plurality of physical random access channel occasion groups.

In an implementation, the value of the first index corresponds to a first occasion number, and a number of physical random access channel occasions included in at least one physical random access channel occasion group of the plurality of physical random access channel occasion groups is equal to the first occasion number.

In an implementation, the value of the first index corresponds to a first physical random access channel occasion index, the first physical random access channel occasion index is used to determine a first physical random access channel occasion from a plurality of physical random access channel occasions included in the plurality of physical random access channel occasion groups, and each of the plurality of physical random access channel occasions included in the plurality of physical random access channel occasion groups belongs to one of the plurality of physical random access channel occasion groups.

In an implementation, the second signaling includes a plurality of indication fields, and at least one of the plurality of indication fields is used to indicate the value of the first index.

In an implementation, the plurality of indication fields include at least two of following: an uplink/supplementary uplink indication field, a synchronization signal/physical broadcast channel block index field, a first index field, and a reserved bits field; where the first index field is used to indicate at least one physical random access channel occasion group of the plurality of physical random access channel occasion groups; or the synchronization signal/physical broadcast channel block index field and the first index field are jointly used to indicate at least one physical random access channel occasion group of the plurality of physical random access channel occasion groups.

According to a third aspect, a method for a first node used for wireless communication is provided, including: receiving first signaling, where the first signaling is used to determine a plurality of physical random access channel occasion groups, and each of the plurality of physical random access channel occasion groups includes a plurality of physical random access channel occasions; and receiving second signaling, where the second signaling is used to indicate a value of a first index, and the value of the first index corresponds to at least one physical random access channel occasion group of the plurality of physical random access channel occasion groups.

In an implementation, the method further includes: transmitting a plurality of physical random access channels on a target physical random access channel occasion group; where the target physical random access channel occasion group is one of the at least one physical random access channel occasion group corresponding to the value of the first index.

In an implementation, the method further includes: transmitting a plurality of physical random access channels on a target physical random access channel occasion group; where the target physical random access channel occasion group is a physical random access channel occasion group, other than the at least one physical random access channel occasion group corresponding to the value of the first index, in the plurality of physical random access channel occasion groups determined by the first signaling.

In an implementation, the value of the first index is one of a plurality of non-negative integers, and the plurality of non-negative integers are in a one-to-one correspondence with a plurality of physical random access channel occasion group subsets; and each of the plurality of physical random access channel occasion group subsets includes at least one physical random access channel occasion group of the plurality of physical random access channel occasion groups.

In an implementation, at least one physical random access channel occasion group included in at least one physical random access channel occasion group subset of the plurality of physical random access channel occasion group subsets is allowed to be used for multiple physical random access channel transmissions.

In an implementation, at least one physical random access channel occasion group included in at least one physical random access channel occasion group subset of the plurality of physical random access channel occasion group subsets is forbidden to be used for multiple physical random access channel transmissions.

In an implementation, third signaling is used to configure a correspondence between the plurality of non-negative integers and the plurality of physical random access channel occasion group subsets.

In an implementation, the at least one physical random access channel occasion group corresponding to the value of the first index is associated with a same synchronization signal/physical broadcast channel block index.

In an implementation, the value of the first index corresponds to a first physical random access channel occasion group index, and the first physical random access channel occasion group index is used to determine a first physical random access channel occasion group from the plurality of physical random access channel occasion groups.

In an implementation, the value of the first index corresponds to a first occasion number, and a number of physical random access channel occasions included in at least one physical random access channel occasion group of the plurality of physical random access channel occasion groups is equal to the first occasion number.

In an implementation, the value of the first index corresponds to a first physical random access channel occasion index, the first physical random access channel occasion index is used to determine a first physical random access channel occasion from a plurality of physical random access channel occasions included in the plurality of physical random access channel occasion groups, and each of the plurality of physical random access channel occasions included in the plurality of physical random access channel occasion groups belongs to one of the plurality of physical random access channel occasion groups.

In an implementation, the second signaling includes a plurality of indication fields, and at least one of the plurality of indication fields is used to indicate the value of the first index.

In an implementation, the plurality of indication fields include at least two of following: an uplink/supplementary uplink indication field, a synchronization signal/physical broadcast channel block index field, a first index field, and a reserved bits field; where the first index field is used to indicate at least one physical random access channel occasion group of the plurality of physical random access channel occasion groups; or the synchronization signal/physical broadcast channel block index field and the first index field are jointly used to indicate at least one physical random access channel occasion group of the plurality of physical random access channel occasion groups.

According to a fourth aspect, a method for a second node used for wireless communication is provided, including: transmitting first signaling, where the first signaling is used to determine a plurality of physical random access channel occasion groups, and each of the plurality of physical random access channel occasion groups includes a plurality of physical random access channel occasions; and transmitting second signaling, where the second signaling is used to indicate a value of a first index, and the value of the first index corresponds to at least one physical random access channel occasion group of the plurality of physical random access channel occasion groups.

In an implementation, the method further includes: receiving a plurality of physical random access channels, where the plurality of physical random access channels are transmitted on a target physical random access channel occasion group; where the target physical random access channel occasion group is one of the at least one physical random access channel occasion group corresponding to the value of the first index.

In an implementation, the method further includes: receiving a plurality of physical random access channels, where the plurality of physical random access channels are transmitted on a target physical random access channel occasion group; where the target physical random access channel occasion group is a physical random access channel occasion group, other than the at least one physical random access channel occasion group corresponding to the value of the first index, in the plurality of physical random access channel occasion groups determined by the first signaling.

In an implementation, the value of the first index is one of a plurality of non-negative integers, and the plurality of non-negative integers are in a one-to-one correspondence with a plurality of physical random access channel occasion group subsets; and each of the plurality of physical random access channel occasion group subsets includes at least one physical random access channel occasion group of the plurality of physical random access channel occasion groups.

In an implementation, at least one physical random access channel occasion group included in at least one physical random access channel occasion group subset of the plurality of physical random access channel occasion group subsets is allowed to be used for multiple physical random access channel transmissions.

In an implementation, at least one physical random access channel occasion group included in at least one physical random access channel occasion group subset of the plurality of physical random access channel occasion group subsets is forbidden to be used for multiple physical random access channel transmissions.

In an implementation, third signaling is used to configure a correspondence between the plurality of non-negative integers and the plurality of physical random access channel occasion group subsets.

In an implementation, the at least one physical random access channel occasion group corresponding to the value of the first index is associated with a same synchronization signal/physical broadcast channel block index.

In an implementation, the value of the first index corresponds to a first physical random access channel occasion group index, and the first physical random access channel occasion group index is used to determine a first physical random access channel occasion group from the plurality of physical random access channel occasion groups.

In an implementation, the value of the first index corresponds to a first occasion number, and a number of physical random access channel occasions included in at least one physical random access channel occasion group of the plurality of physical random access channel occasion groups is equal to the first occasion number.

In an implementation, the value of the first index corresponds to a first physical random access channel occasion index, the first physical random access channel occasion index is used to determine a first physical random access channel occasion from a plurality of physical random access channel occasions included in the plurality of physical random access channel occasion groups, and each of the plurality of physical random access channel occasions included in the plurality of physical random access channel occasion groups belongs to one of the plurality of physical random access channel occasion groups.

In an implementation, the second signaling includes a plurality of indication fields, and at least one of the plurality of indication fields is used to indicate the value of the first index.

In an implementation, the plurality of indication fields include at least two of following: an uplink/supplementary uplink indication field, a synchronization signal/physical broadcast channel block index field, a first index field, and a reserved bits field; where the first index field is used to indicate at least one physical random access channel occasion group of the plurality of physical random access channel occasion groups; or the synchronization signal/physical broadcast channel block index field and the first index field are jointly used to indicate at least one physical random access channel occasion group of the plurality of physical random access channel occasion groups.

According to a fifth aspect, a first node used for wireless communication is provided, including a transceiver, a memory, and a processor, where the memory is configured to store a program, and the processor is configured to: invoke the program in the memory, and control the transceiver to receive or transmit a signal, so that the first node performs the method in any implementation of the third aspect.

According to a sixth aspect, a second node used for wireless communication is provided, including a transceiver, a memory, and a processor, where the memory is configured to store a program, and the processor is configured to: invoke the program in the memory, and control the transceiver to receive or transmit a signal, so that the second node performs the method in any implementation of the fourth aspect.

According to a seventh aspect, an embodiment of the present application provides a communication system, where the system includes the first node and/or the second node described above. In another possible design, the system may further include another device interacting with the first node or the second node in the solution provided in embodiments of the present application.

According to an eighth aspect, an embodiment of the present application provides a computer-readable storage medium. The computer-readable storage medium stores a computer program, and the computer program enables a computer to perform some or all of the steps in the method according to the foregoing aspects.

According to a ninth aspect, an embodiment of the present application provides a computer program product. The computer program product includes a non-transitory computer-readable storage medium storing a computer program, and the computer program is operable to enable a computer to perform some or all of the steps of the method according to the foregoing aspects. In some implementations, the computer program product may be a software installation package.

According to a tenth aspect, an embodiment of the present application provides a chip. The chip includes a memory and a processor, and the processor may invoke and run a computer program from the memory, to implement some or all of the steps of the method according to the foregoing aspects.

In a case that the first node corresponds to a plurality of physical random access channel occasion groups, second signaling may be used in embodiments of the present application to indicate at least one physical random access channel occasion group of the plurality of physical random access channel occasion groups, so that the first node determines, according to an indication of the second signaling, a physical random access channel occasion group corresponding to the multiple PRACH transmissions.

BRIEF DESCRIPTION OF THE DRAWINGS

FIG. 5 is an example of an indication corresponding to a PRACH mask index indicator field.

FIG. 6 is another example of an indication corresponding to a PRACH mask index indicator field.

FIG. 7 is still another example of an indication corresponding to a PRACH mask index indicator field.

FIG. 8 is still another example of an indication corresponding to a PRACH mask index indicator field.

FIG. 9 is still another example of an indication corresponding to a PRACH mask index indicator field.

FIG. 10 is still another example of an indication corresponding to a PRACH mask index indicator field.

DETAILED DESCRIPTION OF THE EMBODIMENTS

Architecture of a Communication System

Figure 1:
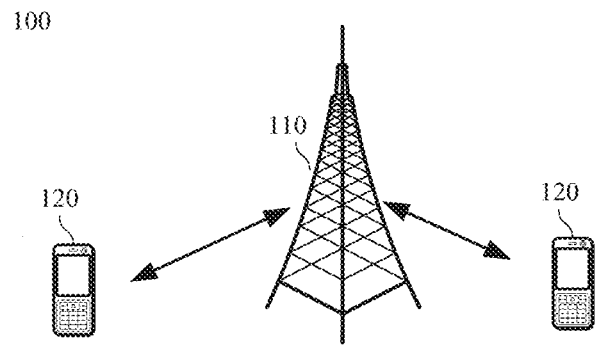
FIG. 1 is an example diagram of a system architecture of a wireless communication system to which embodiments of the present application are applicable.

FIG. 1 is an example diagram of a system architecture of a wireless communication system 100 to which embodiments of the present application are applicable. The wireless communication system 100 may include a network device 110 and a user equipment 120. The network device 110 may be a device in communication with the user equipment 120. The network device 110 may provide communication coverage for a specific geographic area, and may communicate with the user equipment 120 located within the coverage.

FIG. 1 exemplarily shows one network device and two user equipments. Optionally, the wireless communication system 100 may include a plurality of network devices, and another number of user equipments may be included in coverage of each network device, which is not limited in embodiments of the present application.

Optionally, the wireless communication system 100 may further include other network entities such as a network controller and a mobility management entity, which is not limited in embodiments of the present application.

It should be understood that although the technical solutions of embodiments of the present application may be used for random access, the technical solutions of embodiments of the present application can also be used for beam failure recovery. Further, the technical solutions of embodiments of the present application may be used for a Type-1 random access procedure, and the technical solutions of embodiments of the present application can also be used for a Type-2 random access procedure. Further, the technical solutions of embodiments of the present application may be used for a Uu interface, and the technical solutions of embodiments of the present application can also be used for a PC5 interface. Further, the technical solutions of embodiments of the present application may be used for single-carrier communication, and the technical solutions of embodiments of the present application can also be used for multi-carrier communication. Further, the technical solutions of embodiments of the present application may be used for multi-antenna communication, and the technical solutions of embodiments of the present application can also be used for single-antenna communication. Further, although the technical solutions of embodiments of the present application may be used for a scenario of a user equipment and a base station, the technical solutions of embodiments of the present application are also applicable to a vehicle-to-everything (V2X) scenario, and a communication scenario in which a user equipment communicates with a relay and the relay communicates with a base station, which achieves a technical effect similar to that in the scenario of a user equipment and a base station. Further, the technical solutions of embodiments of the present application may be applied to various communication scenarios, such as an enhanced mobile broadband (eMBB) scenario, an ultra-reliable and low latency communications (URLLC) scenario, and a massive machine type communication (mMTC) scenario. In addition, using a unified solution for different scenarios may also help reduce hardware complexity and costs.

It should be understood that the technical solutions of embodiments of the present application may be applied to various communication systems, such as a $5^{th}$ generation (5G) system or a new radio (NR) system, a long term evolution (LTE) system, an LTE frequency division duplex (FDD) system, and an LTE time division duplex (TDD) system. The technical solutions provided in the present application may be further applied to a future communication system, such as a $6^{th}$ generation mobile communication system or a satellite communication system.

The user equipment in embodiments of the present application may also be referred to as a terminal device, an access terminal, a subscriber unit, a subscriber station, a mobile site, a mobile station (MS), a mobile terminal (MT), a remote station, a remote terminal, a mobile device, a user terminal, a terminal, a wireless communication device, a user agent, or a user apparatus. The user equipment in embodiments of the present application may be a device providing a user with voice and/or data connectivity and may be used to connect to people, objects, and machines, such as a handheld device or vehicle-mounted device having a wireless connection function. The user equipment in embodiments of the present application may be a mobile phone, a tablet computer (pad), a notebook computer, a palmtop computer, a mobile Internet device (MID), a wearable device, a virtual reality (VR) device, an augmented reality (AR) device, a wireless terminal in industrial control, a wireless terminal in self driving, a wireless terminal in remote medical surgery, a wireless terminal in a smart grid, a wireless terminal in transportation safety, a wireless terminal in a smart city, a wireless terminal in a smart home, or the like. Optionally, the UE may be used to function as a base station. For example, the UE may function as a scheduling entity, and it provides a sidelink signal between UEs in V2X, D2D, or the like. For example, a cellular phone and a vehicle communicate with each other through a sidelink signal. A cellular phone and a smart household device communicate with each other, without the relay of a communication signal through a base station.

The network device in embodiments of the present application may be a device for communicating with the user equipment. The network device may also be referred to as an access network device or a wireless access network device. For example, the network device may be a base station. The network device in embodiments of the present application may be a radio access network (RAN) node (or device) that connects the user equipment to a wireless network. The base station may broadly cover the following various names, or may be interchanged with the following names, such as a NodeB, an evolved NodeB (eNB), a next generation NodeB (gNB), a relay station, an access point, a transmitting and receiving point (TRP), a transmitting point (TP), a master eNode MeNB, a secondary eNode SeNB, a multi-standard radio (MSR) node, a home base station, a network controller, an access node, a radio node, an access point (AP), a transmission node, a transceiver node, a baseband unit (BBU), a remote radio unit (RRU), an active antenna unit (AAU), a remote radio head (RRH), a central unit (CU), a distributed unit (DU), and a positioning node. The base station may be a macro base station, a micro base station, a relay node, a donor node, or the like, or a combination thereof. Alternatively, the base station may be a communication module, a modem, or a chip disposed in the device or apparatus described above. Alternatively, the base station may be a mobile switching center, a device that functions as a base station in device to device (D2D), vehicle-to-everything (V2X), and machine-to-machine (M2M) communications, a network-side device in a 6G network, a device that functions as a base station in a future communication system, or the like. The base station may support networks with a same access technology or different access technologies. A specific technology and a specific device form used by the network device are not limited in embodiments of the present application.

The base station may be a fixed or mobile base station. For example, a helicopter or an unmanned aerial vehicle may be configured to function as a mobile base station, and one or more cells may move according to a position of the mobile base station. In another example, a helicopter or an unmanned aerial vehicle may be configured to serve as a device in communication with another base station.

In some deployments, the network device in embodiments of the present application may be a CU or a DU, or the network device includes a CU and a DU. The gNB may further include an AAU.

The network device and the user equipment may be deployed on land, including being indoors or outdoors, handheld, or in-vehicle, may be deployed on a water surface, or may be deployed on a plane, a balloon, or a satellite in the air. A scenario in which the network device and the user equipment are located is not limited in embodiments of the present application.

It should be understood that all or some of functions of the communication device in the present application may also be implemented by software functions running on hardware, or by virtualization functions instantiated on a platform (for example, a cloud platform).

Triggering of a Random Access Procedure

The random access procedure is one of basic processes in a communication system. The random access procedure can ensure that a user equipment can quickly connect to a network device (such as a base station) when entering a cell or needing to reconnect to the cell.

The random access procedure may include a plurality of types. For example, the random access procedure may include a contention-based random access procedure and a contention-free random access procedure. Alternatively, the random access procedure may include a 4-step random access procedure and a 2-step random access procedure.

There are a plurality of manners of initiating the random access procedure, which may include, for example, a random access procedure initiated by a physical downlink control channel (PDCCH) order, a random access procedure initiated by a medium access control (MAC) entity, a random access procedure initiated by a radio resource control (RRC) event, and the like. For detailed description about the initiating manners of the random access procedure, refer to related description in 3GPP TS38.321.

The initiating by a PDCCH order is mainly used after an uplink is out of synchronization. When the network device has downlink data needing to be transmitted, a PDCCH order may be used to force the user equipment to initiate a random access procedure, so as to complete uplink time synchronization. Alternatively, the initiating by a PDCCH order may be used to establish time alignment for a secondary timing advance group (STAG).

In some embodiments, the random access procedure initiated by a PDCCH order may include the following two cases: a contention-based random access procedure initiated by a PDCCH order, and a contention-free random access procedure initiated by a PDCCH order. For example, a random access procedure on a primary secondary cell may be a contention-based random access procedure initiated by a PDCCH order; alternatively, a random access procedure on a secondary cell may be a contention-free random access procedure initiated by a PDCCH order. This is described below with reference to Table 1 and Table 2.

TABLE 1

DCI format 1_0

| Field (field) | Value |
|---|---|
| identifier for DCI format (1 bit) | 1 |
| Frequency domain resource assignment | All ones |
| Random access preamble index (6 bits) | All zeros (000000) |
| Uplink/supplemental uplink indicator (1 bit) | Reserved value |
| SS/PBCH index (6 bits) | Reserved value |
| PRACH mask indicator (4 bits) | Reserved value |
| Reserved bits (12 bits or 10 bits) | Reserved value |

Table 1 shows information indicated by a network to a terminal device through DCI format 1_0 in the case of a contention-based random access procedure initiated by a PDCCH order. It can be learned from Table 1 that, when the PDCCH order is used to initiate a contention-based random access procedure, DCI format 1_0 does not specify any random access resource (such as a random access preamble, a ROG, or the like), and the user equipment randomly selects a random access resource. In this case, it is easy to cause a conflict between the random access procedure and another uplink transmission.

In an embodiment, a cyclic redundancy check (CRC) in the DCI format 1_0 is scrambled. For example, the CRC in the DCI format 1_0 is scrambled by a cell radio network temporary identifier (C-RNTI).

TABLE 2

DCI format 1_0

| Field (field) | Value |
|---|---|
| identifier for DCI format (1 bit) | 1 |
| Frequency domain resource assignment | All ones |
| Random access preamble index (6 bits) | Not all zeros |
| Uplink/supplemental uplink indicator (1 bit) | 0/1 |
| SS/PBCH index (6 bits) | One of 0 to 63 |
| DCI format 1_0 | |
| Field (field) | Value |
| PRACH mask indicator (4 bits) | One of 0 to 10 |
| Reserved bits (12 bits or 10 bits) | Reserved value |

Table 2 shows information indicated by a network to a terminal device through DCI format 1_0 in the case of a contention-free random access procedure initiated by a PDCCH order. It can be learned from Table 2 that, when the PDCCH order is used to initiate a contention-free random access procedure, DCI format 1_0 can specify only an RO associated with a specific SS/PBCH block. In some cases, PRACH transmission based on this RO may also cause a conflict with another uplink transmission.

In an embodiment, a CRC in the DCI format 1_0 is scrambled, for example, scrambled by a C-RNTI.

In an embodiment, in a case that the PDCCH order triggers a contention-free random access procedure, a PRACH mask indicator field in the DCI format 1_0 can specify only a specific RO associated with an SS/PBCH block. An example of a correspondence between a PRACH mask indicator field in DCI format 1_0 and an RO associated with an SS/PBCH block is given below with reference to Table 3.

TABLE 3

| PRACH mask indicator field | RO allowed by SS/PBCH block |
|---|---|
| 0 | All (all) |
| 1 | RO index 1 |
| 2 | RO index 2 |
| 3 | RO index 3 |
| 4 | RO index 4 |
| 5 | RO index 5 |
| 6 | RO index 6 |
| 7 | RO index 7 |
| 8 | RO index 8 |
| 9 | Every even RO |
| 10 | Every odd RO |
| 11 | Reserved value |
| 12 | Reserved value |
| 13 | Reserved value |
| 14 | Reserved value |
| 15 | Reserved value |

In the example of Table 3, it can be learned that there is a correspondence between the PRACH mask indicator field and an RO associated with an SS/PBCH block. In this way, when receiving DCI format 1_0, the user equipment may accordingly determine a corresponding RO based on a value indicated by the PRACH mask indicator field in the DCI format 1_0. For example, the user equipment receives a value 0 indicated by the PRACH mask indicator field in DCI format 1_0, the user equipment may determine that all ROs can be used for PRACH transmission. Alternatively, the user equipment receives a value 3 indicated by the PRACH mask indicator field in DCI format 1_0, the user equipment may determine that an RO corresponding to an RO index 3 may be used for PRACH transmission.

Coverage Enhancements of PRACH Transmissions

Coverage performance of a communication system (for example, an NR system) is an important factor that needs to be considered when an operator performs commercial deployment of a communication network, because the coverage performance of the communication system directly affects service quality of the communication system and costs of the operator, for example, capital expenditure (CAPEX) of the operator and the operating expenditure (OPEX) of the operator.

Coverage performance of a communication system varies with different operating frequency bands of the communication system. For example, compared with an LTE system, the NR system uses a higher operating frequency band (for example, a millimeter-wave frequency band), which results in a larger path loss of the NR system, thereby resulting in a poorer coverage performance of the NR system. Therefore, as a frequency band supported by a communication system may become increasingly high, how to enhance coverage of the communication system becomes a problem to be resolved.

In most scenarios of practical deployment, since capability of a user equipment is lower than that of a network device, coverage performance of an uplink is a bottleneck for enhancing coverage of a communication system. With the development of communication technologies, uplink services, for example, a video uploading service, in some emerging vertical use cases gradually increase. In a scenario with many uplink services, how to enhance uplink coverage is a problem needing to be further resolved.

In the related art, there has been a technical solution of coverage enhancement for some uplinks. For example, in Release 17 (Rel-17) of the NR, a coverage enhancement solution has been designed for a physical uplink shared channel (PUSCH), a physical uplink control channel (PUCCH), and a message 3 (Msg3) in a random access procedure.

However, no coverage enhancement solution is designed for a PRACH in Rel-17, but PRACH transmission (PRACH transmission, or referred to as PRACH transmitting) performance is very important to many procedures such as an initial access procedure and a beam failure recovery procedure, and therefore, it is also very important to perform coverage enhancement on a PRACH. On such a basis, through the 3rd Generation Partnership Project (3GPP) RP-221858, a work item (WI) of "further NR coverage enhancements (further NR coverage enhancements)" was formally established in Rel-18, and enhancing coverage performance of PRACH transmission is one of the important topics of the work item.

In a possible implementation, multiple PRACH transmissions (multiple PRACH transmissions) may be used for a coverage enhancement of PRACH transmissions. In other words, a coverage enhancement of PRACH transmissions may be implemented through repeated PRACH transmissions (for example, a preamble is transmitted in a PRACH a plurality of times). It should be noted that in the present application, multiple PRACH transmissions may also be replaced by a multi-PRACH transmission, a plurality of PRACH transfers, a multi-PRACH transfer, repeated PRACH transmissions, PRACH repeated transmissions, and a Type-3 random access procedure, and other terms. This is not limited in embodiments of the present application. In other words, the multiple PRACH transmissions mentioned in the present application may be replaced by at least one of a multi-PRACH transmission, a plurality of PRACH transfers, a multi-PRACH transfer, repeated PRACH transmissions, PRACH repeated transmissions, and a Type-3 random access procedure.

In embodiments of the present application, multiple PRACH transmissions may refer to multiple PRACH transmissions with a same beam, or may refer to multiple PRACH transmissions with different beams. Multiple PRACH transmissions with a same beam is used as an example. An agreement has been reached at 3GPP radio access network (RAN) 1 #110-bis-e meeting: PRACH occasions (or referred to as RACH occasions) at least at different time instances (time instances, or referred to as time points, temporal instances, or the like) may be used for multiple PRACH transmissions with a same beam. In other words, a physical random access channel occasion group (PRACH occasion group, ROG) may be used for multiple PRACH transmissions with a same beam.

In addition, the RAN1 #110bis-e meeting further defines the number of multiple PRACH transmissions with a same beam (times of multiple PRACH transmissions/repetition factor). Values of the number may at least include 2, 4, and 8. That is, a ROG may include 2, 4, or 8 valid physical random access channel occasions (PRACH occasions, ROs). The following further describes the ROG.

Physical Random Access Channel Occasion Group

In some scenarios, "ROG" is introduced to indicate a set of a plurality of physical random access channel occasions (ROs). Therefore, "ROG" may also be referred to as "RO set". A name of the ROG is not limited in embodiments of the present application. For ease of description, embodiments of the present application are described based on the ROG. A name of the physical random access channel occasion is not limited in embodiments of the present application. For example, the physical random access channel occasion may also be referred to as a random access occasion, or may also be referred to as a transmission occasion or the like. For ease of description, embodiments of the present application are described based on the physical random access channel occasion. The physical random access channel occasion and the random access occasion mentioned in embodiments of the present application may be interchanged.

In an embodiment, the ROG may be used for multiple PRACH transmissions with a same beam.

In an embodiment, the ROG may include ROs corresponding to multiple PRACH transmissions with a same beam.

In an embodiment, it is also discussed in some meetings (for example, 3GPP RAN1 #110bis-e) that ROs located in different time instances may be used for multiple PRACH transmissions with a same beam. In other words, a plurality of ROs in a ROG may be located in different time instances.

In an embodiment, for a specific number of PRACH transmissions, a ROG includes a valid RO, which helps the specific number of PRACHs be transmitted through the valid RO.

In an embodiment, all ROs in a ROG may be associated with one synchronization signal block (or referred to as synchronization signal/physical broadcast channel block, synchronization signal/physical broadcast channel block, SS/PBCH block, SSB). For brevity, the synchronization signal block or the synchronization signal/physical broadcast channel block is briefly referred to as an SS/PBCH, and may be arbitrarily interchanged with the SS/PBCH block or SSB. Certainly, in embodiments of the present application, one ROG may be associated with a plurality of SS/PBCH.

It can be learned that in a solution of multiple PRACH transmissions, a plurality of PRACHs can be transmitted on a ROG. In this case, how to determine a ROG corresponding to the multiple PRACH transmissions is a problem that needs to be resolved, for example, how to determine a ROG or some ROGs on which the multiple PRACH transmissions are to be performed, or how to determine which ROG or which ROGs cannot be used for multiple PRACH transmissions to avoid a conflict with another transmission.

In view of the foregoing problems, the present application provides a method for a node used for wireless communication and an apparatus. In a case that a first node corresponds to a plurality of ROGs, second signaling may be used to indicate at least one ROG of the plurality of ROGs in embodiments of the present application, so that the first node determines, based on the second signaling, a ROG corresponding to the multiple PRACH transmissions.

The present application may be applied to a scenario of multiple PRACH transmissions, that is, repeated transmissions of a plurality of PRACHs may be used to implement a PRACH coverage enhancement.

The present application may be applied to a plurality of types of random access procedures. In an embodiment, embodiments of the present application may be applied to a 4-step random access procedure. In another embodiment, embodiments of the present application may be applied to a 2-step random access procedure. In an embodiment, embodiments of the present application may be applied to a contention-based random access procedure. In another embodiment, embodiments of the present application may be applied to a contention-free random access procedure.

The present application may be applied to random access procedures initiated by different initiating manners. In an embodiment, embodiments of the present application may be applied to a random access procedure initiated by a PDCCH order. In another embodiment, embodiments of the present application may be applied to a random access procedure initiated by a MAC entity. In an embodiment, embodiments of the present application may be applied to a random access procedure initiated by an RRC event.

In an embodiment, the multiple PRACH transmissions mentioned in the present application may refer to multiple PRACH transmissions with a same beam; in this case, repeated transmissions of a plurality of PRACHs are performed on a same beam to obtain a signal to noise ratio (SNR) gain.

In an embodiment, the multiple PRACH transmissions mentioned in the present application may refer to multiple PRACH transmissions with different beams; in this case, repeated transmissions of a plurality of PRACHs are performed on different beams to obtain a diversity gain.

The methods and apparatus provided in the present application are exemplarily illustrated below by using a plurality of embodiments or examples. It should be understood that, in the case of no conflict, embodiments and features in the embodiments for the first node of the present application may be applied to a second node, and vice versa. In the case of no conflict, embodiments and the features in the embodiments of the present application may be arbitrarily combined with each other.

Figure 2:
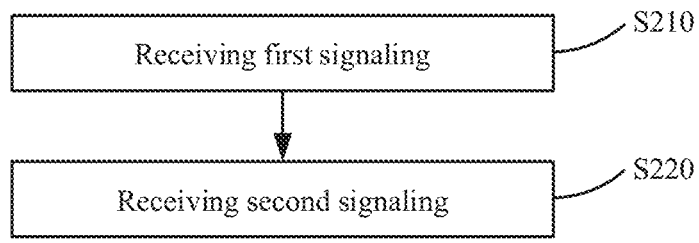
FIG. 2 is a schematic flowchart of a method for a first node used for wireless communication according to an embodiment of the present application.

FIG. 2 is a schematic flowchart of a method for a node used for wireless communication according to an embodiment of the present application. The method shown in FIG. 2 may be performed by a first node. The following first briefly describes the first node.

In an embodiment, the first node may be any type of node, capable of performing multiple PRACH transmissions on a ROG, in a communication system.

In an embodiment, the first node may be a user equipment, for example, user equipment 120 shown in FIG. 1.

In an embodiment, the first node may be a network-controlled repeater (NCR).

In an embodiment, the first node may be a relay, such as a relay terminal.

In an embodiment, the first node may include one or more receiving sets. For example, the first node may include a receiving set, and the receiving set may receive a plurality of types of signaling or data. Alternatively, the first node may include a plurality of receiving sets, and the plurality of receiving sets may receive different signaling or data.

In a sub-embodiment of the foregoing embodiment, the first node may include a first receiving set and a second receiving set.

In an embodiment, the first node may further include a transmitting set. For example, the first node may further include a first transmitting set.

The method shown in FIG. 2 is described below. Refer to FIG. 2. The method shown in FIG. 2 may include step S210 and step S220.

In step S210, first signaling is received.

In an embodiment, the first signaling is used to determine a plurality of ROGs. In other words, the first signaling is used to configure a plurality of ROGs.

In an embodiment, the plurality of ROGs determined by the first signaling may be used by the first node to perform multiple PRACH transmissions.

In an embodiment, each ROG of the plurality of ROGs includes a plurality of ROs.

In an embodiment, a plurality of ROs included in any ROG of the plurality of ROGs may be used to perform multiple PRACH transmissions. In other words, the multiple PRACH transmissions may be performed on a plurality of ROs included in any ROG of the plurality of ROGs.

In an embodiment, the multiple PRACH transmissions correspond to one random access attempt (PRACH attempt).

In an embodiment, the multiple PRACH transmissions are used for one random access attempt.

In an embodiment, the multiple PRACH transmissions include separately transmitting a plurality of random access preambles on the one random access attempt.

In an embodiment, a plurality of ROs included in each ROG of the plurality of ROGs may be used to transmit a plurality of random access preambles. In other words, a plurality of random access preambles may be respectively transmitted on a plurality of ROs.

In an embodiment, the first signaling is received by the first node by using the first receiving set.

In an embodiment, the first signaling is transmitted by a second node to the first node.

In an embodiment, the second node may be a network device. However, embodiments of the present application are not limited thereto. For example, the first signaling may be transmitted by a node other than the second node.

In an embodiment, the first signaling is high layer signaling or higher layer signaling.

In an embodiment, the first signaling is RRC layer signaling.

In an embodiment, the first signaling is MAC layer signaling.

In step S220, second signaling is received.

In an embodiment, the second signaling is used to indicate a value of a first index. The value of the first index corresponds to at least one ROG of the plurality of ROGs. In other words, the value of the first index corresponds to one or more ROGs of the plurality of ROGs.

Implementations of indicating the value of the first index by the second signaling are not specifically limited in embodiments of the present application. The implementations of indicating the value of the first index by the second signaling are described subsequently with reference to specific embodiments. For brevity, details are not described herein.

In an embodiment, the at least one ROG corresponding to the value of the first index may be used by the first node to perform multiple PRACH transmissions. In other words, the second signaling may be used to indicate a ROG used for multiple PRACH transmissions to the first node.

In an embodiment, the at least one ROG corresponding to the value of the first index may be forbidden to be used by the first node to perform multiple PRACH transmissions. In other words, the second signaling may be used to indicate, to the first node, a ROG forbidden to be used for multiple PRACH transmissions. It should be understood that in some embodiments, that the at least one ROG corresponding to the value of the first index may be forbidden to be used by the first node to perform multiple PRACH transmissions may be interchanged with at least one of following: the at least one ROG corresponding to the value of the first index cannot be used by the first node to perform multiple PRACH transmissions; and the at least one ROG corresponding to the value of the first index should avoid being used by the first node to perform multiple PRACH transmissions.

Implementations of the value of the first index are not specifically limited in embodiments of the present application. The implementations of the value of the first index are described subsequently with reference to specific embodiment. For brevity, details are not described herein.

In an embodiment, the at least one ROG corresponding to the value of the first index is associated with a same SS/PBCH.

In an embodiment, the at least one ROG corresponding to the value of the first index is associated with a same SS/PBCH index.

In an embodiment, the second signaling is received by the first node by using the second receiving set.

In an embodiment, the second signaling is transmitted by the second node to the first node.

In an embodiment, the second node may be a network device. However, embodiments of the present application are not limited thereto. For example, the second signaling may be transmitted by a node other than the second node.

In an embodiment, a node that transmits the second signaling and a node that transmits the first signaling may be a same node. For example, the first signaling and the second signaling may be transmitted by a same network device.

In an embodiment, the second signaling includes downlink control information (DCI).

In an embodiment, the second signaling is DCI.

In an embodiment, the second signaling is carried in DCI.

In an embodiment, in a case that the second signaling includes DCI, a format of the DCI is not specifically limited in embodiments of the present application. For example, in an embodiment, the second signaling includes DCI format 1_0. Certainly, the present application is not limited thereto, and the second signaling may include DCI in another format.

In an embodiment, the second signaling is DCI format 1_0.

In an embodiment, the second signaling is carried in DCI format 1_0.

In an embodiment, the second signaling includes a CRC.

In an embodiment, the CRC in the second signaling is scrambled. For example, the CRC in the second signaling is scrambled by a C-RNTI.

In an embodiment, the second signaling includes high layer signaling or higher layer signaling.

In an embodiment, the second signaling includes RRC layer signaling.

In an embodiment, the second signaling is RRC layer signaling.

In an embodiment, the second signaling is carried in RRC layer signaling.

In an embodiment, the second signaling includes MAC layer signaling.

In an embodiment, the second signaling is MAC layer signaling.

In an embodiment, the second signaling is carried in MAC layer signaling.

In this embodiment of the present application, in a case that a plurality of ROGs are configured for the first node, the second signaling may be used to indicate the value of the first index in embodiments of the present application, to indicate at least one ROG of the plurality of ROGs by using the value of the first index, so that the first node determines, according to an indication of the second signaling, a ROG corresponding to multiple PRACH transmissions.

As mentioned above, in some embodiments, the at least one ROG corresponding to the value of the first index may be used by the first node to perform multiple PRACH transmissions. In some embodiments, the at least one ROG corresponding to the value of the first index may be forbidden to be used by the first node to perform multiple PRACH transmissions. This is described below separately with reference to two embodiments.

Figure 3:
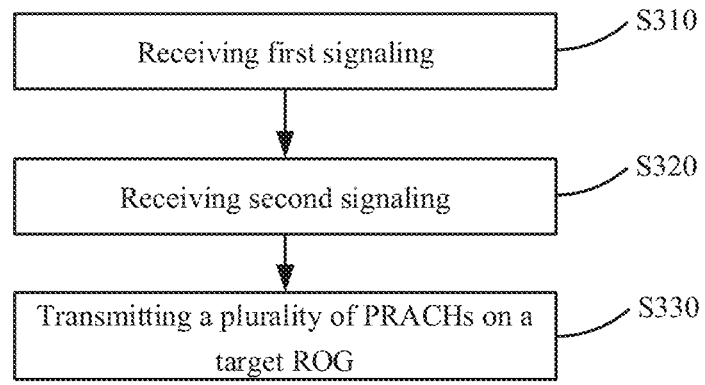
FIG. 3 is a schematic flowchart of a method for a first node used for wireless communication according to another embodiment of the present application.

Embodiment 1: At Least One ROG Corresponding to a Value of a First Index is Used to Perform Multiple PRACH Transmissions FIG. 3 is a schematic flowchart of a method for a node used for wireless communication according to another embodiment of the present application. The method shown in FIG. 3 may be performed by a first node. For related description of the first node, refer to the foregoing description. Details are not described herein again. The method shown in FIG. 3 may include step S310 to step S330.

In step S310, first signaling is received. The first signaling may be used to determine a plurality of ROGs.

In step S320, second signaling is received. The second signaling may be used to indicate a value of a first index, where the value of the first index corresponds to at least one ROG of the plurality of ROGs.

For detailed description of step S310 and step S320, refer to the foregoing description of step S210 and step S220. For brevity, details are not described herein again.

In step S330, a plurality of PRACHs are transmitted on a target ROG.

In an embodiment, the target ROG is one of the at least one ROG corresponding to the value of the first index. In this way, this embodiment of the present application can accurately indicate a ROG used for multiple PRACH transmissions, or this embodiment of the present application can accurately indicate a plurality of ROs used for multiple PRACH transmissions, so as to be better applicable to a scenario of multiple PRACH transmissions.

In an embodiment, the at least one ROG corresponding to the value of the first index is allowed to be used for multiple PRACH transmissions. In a specific example, the plurality of ROGs determined by the first signaling include a first ROG, a second ROG, and a third ROG, and the at least one ROG corresponding to the value of the first index is the first ROG. In this case, the first ROG may be allowed to be used for the multiple PRACH transmissions. In other words, the first ROG may be used by the first node for the current multiple PRACH transmissions. In this way, the first node can determine, based on the second signaling (the value of the first index), a ROG or a plurality of ROs corresponding to the multiple PRACH transmissions, which further helps avoid a problem of an uplink transmission conflict caused by using another ROG for the multiple PRACH transmissions.

In an embodiment, the multiple PRACH transmissions are initiated by a PDCCH order.

In an embodiment, the multiple PRACH transmissions are initiated by a higher layer. For example, the multiple PRACH transmissions are initiated by an RRC layer event. Alternatively, the multiple PRACH transmissions are initiated by a MAC entity.

Embodiment 2: At Least One ROG Corresponding to a Value of a First Index is Forbidden to be Used to Perform Multiple PRACH Transmissions In an embodiment, the first node may use any one or more of the plurality of ROGs determined by the first signaling to perform multiple PRACH transmissions, or in other words, the first node may randomly select one or more of the plurality of ROGs determined by the first signaling to perform multiple PRACH transmissions. However, there are a relatively large number of types of uplink transmissions (UL transmissions), and in many cases, a conflict occurs between a plurality of uplink transmissions. In addition, considering that sidelink transmission and uplink transmission may use same resources (such as frequency domain resources and time resources) for transmission, and therefore a conflict may also occur between uplink transmission and sidelink transmission. Therefore, when one or more ROGs are randomly selected from the plurality of ROGs for multiple PRACH transmissions, a probability of a conflict between a plurality of uplink transmissions or a probability of a conflict between uplink transmission and sidelink transmission may be increased.

For ease of understanding, before the solution of Embodiment 2 is described, a conflict between a plurality of uplink transmissions is first described in detail.

Uplink transmissions may include a plurality of types, for example, may include one or more of following transmissions: a PRACH transmission (for example, a single PRACH transmission or multiple PRACH transmissions), a PUSCH transmission, a PUCCH transmission, a sounding reference signal (SRS) transmission, and the like.

In many cases, a conflict may occur between a plurality of uplink transmissions described above. For example, when a plurality of types of uplink transmissions overlap in time domain, a conflict between the plurality of types of uplink transmissions may be caused. For another example, when power allocated by a user equipment to a plurality of types of uplink transmissions on one transmission occasion exceeds a maximum transmit power value of the user equipment, a conflict may occur between the plurality of types of uplink transmissions. For another example, a conflict may occur between a plurality of types of uplink transmissions due to reasons such as: power allocation exceeding a limit due to dual connectivity, slot format determination, transmission occasions of a plurality of types of uplink transmissions at a same time resource position (such as a same slot), and an excessively small gap between a plurality of types of uplink transmissions. In this case, the user equipment may need to forgo a part of the uplink transmissions or reduce transmit power of a part of the uplink transmissions on a transmission occasion in which the conflict occurs. For example, the user equipment may need to forgo transmission of a PRACH or reduce transmit power of the PRACH on a transmission occasion in which a conflict occurs.

A solution of multiple PRACH transmissions requires transmission of a plurality of PRACHs on a plurality of ROs. Therefore, in a case that multiple PRACH transmissions are used, there is a larger probability that a conflict occurs between multiple PRACH transmissions and another uplink transmission or sidelink transmission, which is described below with reference to FIG. 4.

Figure 4:
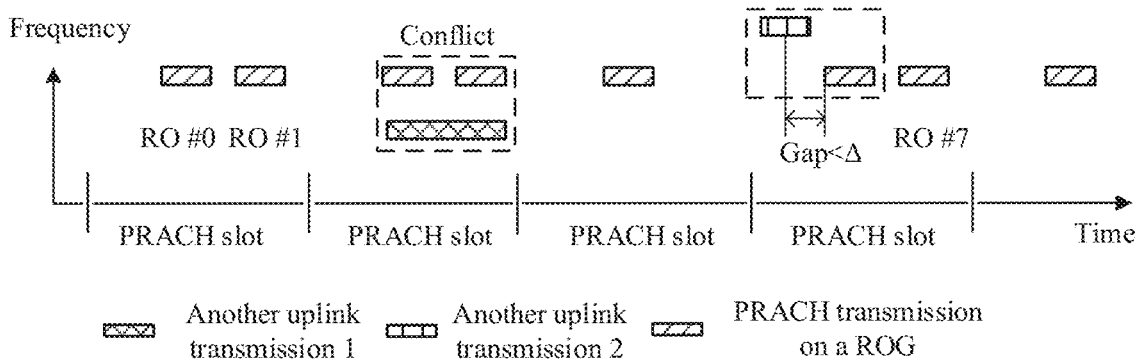
FIG. 4 shows an example of a conflict between multiple PRACH transmissions and other transmissions.

FIG. 4 shows an example of a conflict between multiple PRACH transmissions and other transmissions (for example, other uplink transmissions). As shown in FIG. 4, multiple PRACH transmissions may be transmitted on a plurality of ROs (such as RO #0 to RO #7 in the figure). On some of the plurality of ROs, a conflict may occur because the PRACH transmission overlaps another uplink transmission (such as another uplink transmission 1 in the figure) in time domain. On some of the plurality of ROs, a conflict may occur because a gap between the PRACH transmission and another uplink transmission (such as another uplink transmission 2 in the figure) is too small.

In summary, because a ROG occupied by multiple PRACH transmissions in one random access attempt includes a plurality of ROs, especially some ROGs each include a maximum of eight ROs, a probability of a conflict between the multiple PRACH transmissions and other uplink transmissions or sidelink transmissions significantly increases. In addition, one random access attempt may collide with a plurality of other uplink transmissions or uplink transmissions.

In some cases, if a resource of a ROG is network-configured, when a conflict frequently occurs between multiple PRACH transmissions and other uplink transmissions or sidelink transmissions, the UE may forgo all or a part of the PRACH transmissions. As a result, the user equipment may need to frequently occupy additional ROGs to retransmit PRACHs, so as to perform random access again. Therefore, multiple PRACH transmissions bring more serious system resource consumption than a single PRACH transmission, and leads to an increased access delay of user equipment.

In some cases, a network may assign a highest priority to multiple PRACH transmissions on a primary cell (PCell), but multiple PRACH transmissions on a non-primary cell still face a risk of being forgone or dropped. For example, multiple PRACH transmissions on a primary secondary cell (PSCell) and another secondary cell (SCell) still face a risk of being forgone or dropped.

In other words, in a scenario of multiple PRACH transmissions, one or more of following problems may occur: considering that multiple PRACH transmissions occupy a plurality of time instances, a probability of a conflict between multiple PRACH transmissions and other transmissions is higher, which has greater impact on system performance; a conflict between multiple PRACH transmissions and other transmissions may increase a random access delay; and performance of multiple PRACH transmissions is poor, causing the PRACH transmission to become a bottleneck for a coverage range of a communication system.

In view of the foregoing problems, an embodiment of the present application provides the solution of Embodiment 2 to optimize a solution for a conflict between multiple PRACH transmissions and other transmissions, to mitigate impact on system performance; or improve a performance gain of multiple PRACH transmissions and increase a coverage range; or reduce a random access delay and improve random access resource utilization efficiency. The solution of Embodiment 2 is described below in detail.

Refer to FIG. 3 again. In step S330, the first node transmits a plurality of PRACHs on a target ROG. In an embodiment, the target ROG is a ROG, other than the at least one ROG corresponding to the value of the first index, in the plurality of ROGs determined by the first signaling. In other words, the target ROG is determined from the plurality of ROGs determined by the first signaling, but the target ROG cannot be the at least one ROG corresponding to the value of the first index.

In an embodiment, the at least one ROG corresponding to the value of the first index is forbidden to be used for multiple PRACH transmissions. In a specific example, the plurality of ROGs determined by the first signaling include a first ROG, a second ROG, and a third ROG, and the at least one ROG corresponding to the value of the first index is the first ROG. In this case, the first ROG is forbidden (or prevented or prohibited) from being used for the multiple PRACH transmissions. In other words, the first ROG cannot be used by the first node for the current multiple PRACH transmissions. In this way, the first node can determine, based on the second signaling (the value of the first index), a ROG or ROGs on which the multiple PRACH transmissions cannot be transmitted, which helps avoid a conflict between the multiple PRACH transmissions and other transmissions (such as uplink transmissions or sidelink transmissions), or reduce a probability of a conflict between the multiple PRACH transmissions and other transmissions.

In an embodiment, the multiple PRACH transmissions are initiated by a PDCCH order.

In an embodiment, the multiple PRACH transmissions are initiated by a higher layer. For example, the multiple PRACH transmissions are initiated by an RRC layer event. Alternatively, the multiple PRACH transmissions are initiated by a MAC entity.

The first index and the value of the first index are described below in detail.

In an embodiment, the first index is used to indicate a ROG or a RO included in a ROG. For example, the first index may be used to indicate one or more ROGs, or may be used to indicate a plurality of ROs included in one or more ROGs.

In an embodiment, the first index is a ROG mask index.

In an embodiment, the first index is an RO mask index.

In an embodiment, the first index is used to indicate a number of ROs. For example, the first index may be used to indicate a number of ROs included in one ROG; or the first index may be used to indicate a number of ROs used for multiple PRACH transmissions; or the first index may be used to indicate a number of ROs that are forbidden to be used for multiple PRACH transmissions.

In an embodiment, the value of the first index is one of a plurality of non-negative integers, and the plurality of non-negative integers are in a one-to-one correspondence with a plurality of ROG subsets.

In an embodiment, each of the plurality of ROG subsets includes at least one ROG of the plurality of ROGs. In other words, each of the plurality of ROG subsets includes at least one ROG of the plurality of ROGs determined by the first signaling.

In an embodiment, a ROG subset of the plurality of ROG subsets may include one ROG of the plurality of ROGs. For example, the plurality of ROGs include a first ROG, a second ROG, and a third ROG, and a ROG subset of the plurality of ROG subsets may include only the first ROG.

In an embodiment, a ROG subset of the plurality of ROG subsets may include more than one ROG of the plurality of ROGs. For example, the plurality of ROGs include a first ROG, a second ROG, and a third ROG, and a ROG subset of the plurality of ROG subsets may include the first ROG and the second ROG.

In an embodiment, the value of the first index corresponds to a first ROG subset, and the first ROG subset is one of the plurality of ROG subsets.

In an embodiment, the first ROG subset includes only one ROG.

In an embodiment, the first ROG subset includes only a first ROG.

In an embodiment, the first ROG subset is a first ROG.

In an embodiment, the first ROG subset includes a plurality of ROGs, for example, includes more than one ROG of the plurality of ROGs determined by the first signaling.

In an embodiment, at least one ROG included in at least one ROG subset of the plurality of ROG subsets is allowed to be used for multiple PRACH transmissions.

In an embodiment, at least one ROG included in the at least one ROG subset corresponding to the value of the first index is allowed to be used for multiple PRACH transmissions. For example, if the value of the first index corresponds to a first ROG subset, at least one ROG included in the first ROG subset is allowed to be used for multiple PRACH transmissions.

In an embodiment, at least one ROG included in at least one ROG subset of the plurality of ROG subsets is forbidden to be used for multiple PRACH transmissions.

In an embodiment, at least one ROG included in the at least one ROG subset corresponding to the value of the first index is forbidden to be used for multiple PRACH transmissions. For example, if the value of the first index corresponds to a second ROG subset, at least one ROG included in the second ROG subset is forbidden to be used for multiple PRACH transmissions.

In an embodiment, at least one ROG included in a part of ROG subsets included in the plurality of ROG subsets is allowed to be used for multiple PRACH transmissions, and at least one ROG included in another part of ROG subsets included in the plurality of ROG subsets is forbidden to be used for multiple PRACH transmissions.

In other words, at least one ROG included in at least one ROG subset (for example, the first ROG subset) of the plurality of ROG subsets is allowed to be used for multiple PRACH transmissions, and at least one ROG included in at least one ROG subset (for example, the second ROG subset) of the plurality of ROG subsets is forbidden to be used for multiple PRACH transmissions.

In an embodiment, each of the plurality of ROG subsets is associated with a same SS/PBCH.

In an embodiment, each of the plurality of ROG subsets is associated with a same SS/PBCH index.

In an embodiment, third signaling is used to configure a correspondence between the plurality of non-negative integers and the plurality of ROG subsets.

In an embodiment, the third signaling is transmitted by a second node. The second node may be, for example, a network device, or may be a node other than the network device.

In an embodiment, the third signaling may be high layer signaling or higher-layer signaling. For example, the third signaling may include RRC-layer signaling, or the third signaling may include MAC-layer signaling.

In an embodiment, the correspondence between the plurality of non-negative integers and the plurality of ROG subsets may be preconfigured, for example, may be preconfigured by a network.

As mentioned above, there may be a plurality of implementations of the value of the first index. The implementations of the value of the first index are given below as examples.

Implementation 1: The Value of the First Index is Used to Indicate a ROG Index

In an embodiment, the value of the first index corresponds to a first ROG index, and the first ROG index is used to determine a first ROG from the plurality of ROGs. In other words, the value of the first index is used to indicate a first ROG index, and the first ROG index is used to determine a first ROG from the plurality of ROGs (the plurality of ROGs determined by the first signaling).

In an embodiment, the value of the first index corresponds to at least one ROG index, or in other words, the value of the first index corresponds to one or more ROG indexes.

In an embodiment, the value of the first index corresponds to one ROG index. For example, the value of the first index corresponds to a first ROG index.

In an embodiment, the value of the first index corresponds to a plurality of ROG indexes. For example, the value of the first index corresponds to a first ROG index and a second ROG index.

In an embodiment, each of the plurality of ROG indexes is used to determine a ROG from the plurality of ROGs. In other words, each of the plurality of ROG indexes is used to determine a ROG from the plurality of ROGs determined by the first signaling. For example, the value of the first index corresponds to a first ROG index and a second ROG index, the first ROG index may be used to determine a first ROG, and the second ROG index may be used to determine a second ROG.

Implementation 2: The Value of the First Index is Used to Indicate a Number of ROs In an embodiment, the value of the first index corresponds to a first occasion number, and a number of ROs included in at least one ROG of the plurality of ROGs is equal to the first occasion number.

In an embodiment, the first occasion number is equal to one of {2, 4, 8}.

In an embodiment, the first occasion number is equal to a number of a plurality of ROs included in the first ROG. In other words, if the value of the first index is expected to indicate the first ROG, the value of the first index may be determined as the number of the plurality of ROs included in the first ROG.

In an embodiment, the value of the first index may include a number of ROs and other information. For example, the value of the first index may be used to indicate an RO index and a number of ROs to indicate at least one ROG of the plurality of ROGs.

Implementation 3: The Value of the First Index is Used to Indicate an RO Index

In an embodiment, the value of the first index corresponds to a first RO index, and the first RO index is used to determine a first RO from a plurality of ROs included in the plurality of ROGs.

In an embodiment, the first RO is used to determine a first ROG.

In an embodiment, the first RO and the first occasion number are jointly used to determine a first ROG.

In an embodiment, each of a plurality of ROs included in the plurality of ROGs belongs to one of the plurality of ROGs.

In an embodiment, a plurality of ROs included in the plurality of ROGs belong to different ROGs.

In an embodiment, a plurality of ROs included in the plurality of ROGs belong to a same ROG.

In an embodiment, each of a plurality of ROs included in the plurality of ROGs is an RO of a plurality of ROs included in one ROG of the plurality of ROGs.

In an embodiment, the plurality of ROGs each include a plurality of ROs.

In an embodiment, each of the plurality of ROGs includes a plurality of ROs.

In an embodiment, the first RO belongs to the first ROG.

In an embodiment, the first RO is one of a plurality of ROs included in the first ROG.

In an embodiment, the first RO is the 1st RO of a plurality of ROs included in the first ROG.

In an embodiment, the first RO is the last RO of a plurality of ROs included in the first ROG.

It should be noted that the implementations of the value of the first index listed above may be used separately or in any combination, which is not limited in embodiments of the present application. For example, a ROG index may be separately used as the value of the first index; or a number of ROs may be separately used as the value of the first index; or a ROG index and a number of ROs may be used as the value of the first index; or an RO index and a number of ROs may be used as the value of the first index; and so on.

As mentioned above, the second signaling may be used to indicate the value of the first index. For ease of understanding, implementations of indicating the value of the first index by the second signaling is described below.

In an embodiment, the second signaling includes a plurality of indication fields, and at least one of the plurality of indication fields is used to indicate the value of the first index.

The plurality of indication fields included in the second signaling are not limited in embodiments of the present application. In an embodiment, the plurality of indication fields include at least two of following: an uplink/supplementary uplink indicator (UL/SUL indicator) field, an SS/PBCH index field, a first index field, and a reserved bits field.

In an embodiment, when the second signaling includes DCI or the second signaling includes DCI format 1_0, the plurality of indication fields include at least two of following: a UL/SUL indicator field, an SS/PBCH index field, a first index field, and a reserved bits field.

In an embodiment, the first index field may refer to a ROG mask index field.

In an embodiment, the first index field may be an RO mask index field.

In an embodiment, the first index field may be used to indicate at least one ROG of the plurality of ROGs. In this case, the first index field may be used to indicate one or more ROGs, and the one or more ROGs indicated by the first index field may be associated with any SS/PBCH block. In addition, the one or more ROGs indicated by the first index field are allowed to be used for multiple PRACH transmissions, or the one or more ROGs indicated by the first index field are forbidden to be used for multiple PRACH transmissions.

In an embodiment, the SS/PBCH index field and the first index field may be jointly used to indicate at least one ROG of the plurality of ROGs. In this case, the first index field may be used to indicate one or more ROGs associated with an SS/PBCH index indicated by the SS/PBCH index field, the one or more ROGs that are associated with the SS/PBCH index and that are indicated by the first index field are allowed to be used for multiple PRACH transmissions, or the one or more ROGs that are associated with the SS/PBCH index and that are indicated by the first index field are forbidden to be used for multiple PRACH transmissions.

In an embodiment, the plurality of indication fields included in the second signaling may further include other indication fields in addition to the indication fields listed above. For example, the plurality of indication fields included in the second signaling include at least two of following: an identifier for second signaling format field, a frequency domain resource assignment field, a random access preamble index field, a UL/SUL indicator field, an SS/PBCH index field, a first index field, and a reserved bits field.

In an embodiment, when the second signaling includes DCI or the second signaling includes DCI format 1_0, the plurality of indication fields include at least two of following: an identifier for DCI format field, a frequency domain resource assignment field, a random access preamble index field, a UL/SUL indicator field, an SS/PBCH index field, a first index field, and a reserved bits field.

In an embodiment, a value of the identifier for DCI format field is 1.

In an embodiment, a value of the frequency domain resource assignment field is all ones.

In an embodiment, a value of the random access preamble index field is all zeros.

In an embodiment, a value of the frequency domain resource assignment field is all ones, and a value of the random access preamble index field is all zeros.

In an embodiment, a value of the UL/SUL indicator field is a reserved value.

In an embodiment, a value of the SS/PBCH index field is one of 0 to 63.

In an embodiment, a value of the first index field is one of 0 to 10.

In an embodiment, a value of the SS/PBCH index field is one of 0 to 63, and a value of the first index field is one of 0 to 10.

In an embodiment, a value of the SS/PBCH index field is a reserved value.

In an embodiment, a value of the SS/PBCH index field is a reserved value, and a value of the first index field is one of 0 to 10.

For ease of understanding, the solutions of embodiments of the present application are described below with reference to several specific examples. It should be noted that the following examples are not intended to limit the solutions of embodiments of the present application. It should be further noted that, in the following examples, a random access procedure initiated by a PDCCH order is used as an example, but embodiments of the present application are not limited thereto. The present application may also be applied to a random access procedure initiated in another manner.

Example 1

When a contention-based random access procedure of multiple PRACH transmissions is initiated by a PDCCH order, at least one of a UL/SUL indicator field, an SS/PBCH index field, a PRACH mask index field, and a reserved bits field in second signaling (such as DCI format 1_0) is used to indicate a ROG that is prone to a conflict. After receiving the ROG indicated by the second signaling, a first node randomly selects a random access resource from other random access resources excluding this ROG to perform a random access procedure of multiple PRACH transmissions.

In an embodiment, the SS/PBCH index field and the PRACH mask index field in the second signaling are jointly used to indicate a ROG that is prone to a conflict, or in other words, the SS/PBCH index field and the PRACH mask index field in the second signaling are jointly used to indicate a ROG that is forbidden to be used for multiple PRACH transmissions.

In an implementation, the SS/PBCH index field in the second signaling is used to indicate an SS/PBCH index, and the PRACH mask index field is used to indicate a specific ROG associated with the SS/PBCH index. The specific ROG associated with the SS/PBCH index cannot be used by a user equipment to transmit multiple PRACH transmissions.

For ease of understanding, an example in which the SS/PBCH index field and the PRACH mask index field in the second signaling are jointly used to indicate a ROG that is prone to a conflict is given below with reference to Table 4.

TABLE 4

| DCI format 1_0 | |
|---|---|
| Field (field) | Value |
| Identifier for DCI format (1 bit) | 1 |
| Frequency domain resource assignment | All ones |
| Random access preamble index (6 bits) | All zeros (000000) |
| Uplink/supplemental uplink indicator (1 bit) | Reserved value |
| SS/PBCH index (6 bits) | One of 0 to 63 |
| PRACH mask indicator (4 bits) | One of 0 to 10 |
| Reserved bits (12 bits or 10 bits) | Reserved value |

In an embodiment, the PRACH mask index field in the second signaling is used to indicate a ROG that is prone to a conflict, or in other words, the PRACH mask index field in the second signaling is separately used to indicate a ROG that is prone to a conflict or separately used to indicate a ROG that is forbidden to be used for multiple PRACH transmissions.

In an implementation, only the PRACH mask index field in the second signaling is used to indicate a specific ROG, and the specific ROG associated with each SS/PBCH block cannot be selected by the user equipment for multiple PRACH transmissions.

For ease of understanding, an example in which the PRACH mask index field in the second signaling is separately used to indicate a ROG that is prone to a conflict is given below with reference to Table 5.

TABLE 5

DCI format 1_0

| Field (field) | Value |
| --- | --- |
| Identifier for DCI format (1 bit) | 1 |
| Frequency domain resource assignment | All ones |
| Random access preamble index (6 bits) | All zeros (000000) |
| Uplink/supplemental uplink indicator (1 bit) | Reserved value |
| SS/PBCH index (6 bits) | Reserved value |
| PRACH mask indicator (4 bits) | One of 0 to 10 |
| Reserved bits (12 bits or 10 bits) | Reserved value |

Example 2

It is considered that when a contention-free random access procedure is initiated by a PDCCH order, a PRACH mask indicator field in a conventional DCI format 1_0 can only indicate a specific RO associated with an SS/PBCH block. In other words, the PRACH mask indicator field in the conventional DCI format 1_0 cannot accurately indicate a plurality of ROs used for multiple PRACH transmissions.

In order to accurately indicate a plurality of ROs used for multiple PRACH transmissions, in this embodiment of the present application, one or more indication fields in the second signaling may be used to accurately indicate a ROG or a plurality of ROs.

In an embodiment, a ROG or a plurality of ROs accurately indicated by one or more indication fields in the second signaling are allowed to be used for multiple PRACH transmissions.

In an embodiment, a ROG or a plurality of ROs accurately indicated by one or more indication fields in the second signaling are forbidden to be used for multiple PRACH transmissions.

There are a plurality of implementations of indicating a ROG or a plurality of ROs by the second signaling. For example, the second signaling may indicate only a ROG index, or may indicate a combination of an index of the 1st RO of a plurality of ROs and a number of ROs, or may indicate only a number of ROs, or the like. For details, refer to the foregoing description.

In an embodiment, an indication (a ROG or a plurality of ROs) corresponding to a value of an indication field (for example, the plurality of non-negative integers mentioned above, and the value of the first index belongs to one of values of the indication field), used to accurately indicate a ROG or a plurality of ROs, in the second signaling may be configured through high layer signaling (such as RRC layer signaling). The following describes an indication corresponding to a value of the PRACH mask index indicator field with reference to FIG. 5 to FIG. 10 by using an example in which the PRACH mask index indicator field in the second signaling is used to indicate a ROG or a plurality of ROs.

FIG. 5 shows an example of an indication corresponding to a value of a PRACH mask index indicator field. In the example of FIG. 5, a ROG (for example, one or more ROGs) or a plurality of ROs corresponding to a value of a PRACH mask index indicator field are allowed to be used for multiple PRACH transmissions. In the example of FIG. 5, the value of the PRACH mask index indicator field corresponds to a ROG index, or the ROG or the plurality of ROs corresponding to the value of the PRACH mask index indicator field are indicated by using the ROG index.

In an embodiment, the value of the PRACH mask index indicator field is used to indicate at least one ROG index.

In an embodiment, the value of the PRACH mask index indicator field is used to indicate one ROG index.

In an embodiment, the value of the PRACH mask index indicator field is used to indicate at least one ROG index that is allowed to be used for multiple PRACH transmissions.

In an embodiment, the value of the PRACH mask index indicator field is used to indicate one ROG index that is allowed to be used for multiple PRACH transmissions.

FIG. 6 shows another example of an indication corresponding to a value of a PRACH mask index indication field. In the example of FIG. 6, a ROG (for example, one or more ROGs) or a plurality of ROs corresponding to a value of a PRACH mask index indicator field are allowed to be used for multiple PRACH transmissions. In the example of FIG. 6, the value of the PRACH mask index indicator field corresponds to an RO index and a number of ROs, or the ROG or the plurality of ROs corresponding to the value of the PRACH mask index indicator field are indicated by using the RO index and the number of ROs.

In an embodiment, the value of the PRACH mask index indicator field is used to indicate at least one RO index and at least one number of ROs.

In an embodiment, the value of the PRACH mask index indicator field is used to indicate one RO index and one number of ROs.

In an embodiment, the value of the PRACH mask index indicator field is used to indicate at least one RO index and at least one number of ROs that are allowed to be used for multiple PRACH transmissions.

In an embodiment, the value of the PRACH mask index indicator field is used to indicate one RO index and one number of ROs that are allowed to be used for multiple PRACH transmissions.

FIG. 7 shows still another example of an indication corresponding to a value of a PRACH mask index indication field. In the example of FIG. 7, a ROG (for example, one or more ROGs) or a plurality of ROs corresponding to a value of a PRACH mask index indicator field are allowed to be used for multiple PRACH transmissions. In the example of FIG. 7, the value of the PRACH mask index indicator field corresponds to a number of ROs, or the ROG or the plurality of ROs corresponding to the value of the PRACH mask index indicator field are indicated by using the number of ROs.

In an embodiment, the value of the PRACH mask index indicator field is used to indicate at least one number of ROs.

In an embodiment, the value of the PRACH mask index indicator field is used to indicate one number of ROs.

In an embodiment, the value of the PRACH mask index indicator field is used to indicate at least one number of ROs that are allowed to be used for multiple PRACH transmissions.

In an embodiment, the value of the PRACH mask index indicator field is used to indicate one number of ROs that are allowed to be used for multiple PRACH transmissions.

FIG. 8 shows still another example of an indication corresponding to a value of a PRACH mask index indication field. In the example of FIG. 8, a ROG (for example, one or more ROGs) or a plurality of ROs corresponding to a value of a PRACH mask index indicator field are allowed to be used for multiple PRACH transmissions. In the example of FIG. 8, the value of the PRACH mask index indicator field corresponds to a ROG index, an RO index, and a number of ROs, or the ROG or the plurality of ROs corresponding to the value of the PRACH mask index indicator field are indicated by using the ROG index, the RO index, and the number of ROs.

In an embodiment, the value of the PRACH mask index indicator field is used to indicate at least one ROG index, at least one RO index, and at least one number of ROs.

In an embodiment, the value of the PRACH mask index indicator field is used to indicate one ROG index, one RO index, and one number of ROs.

In an embodiment, the value of the PRACH mask index indicator field is used to indicate at least one ROG index, at least one RO index, and at least one number of ROs that are allowed to be used for multiple PRACH transmissions.

In an embodiment, the value of the PRACH mask index indicator field is used to indicate one ROG index, one RO index, and one number of ROs that are allowed to be used for multiple PRACH transmissions.

FIG. 9 shows still another example of an indication corresponding to a value of a PRACH mask index indication field. In the example of FIG. 9, a ROG (for example, one or more ROGs) or a plurality of ROs corresponding to a value of a PRACH mask index indicator field are forbidden to be used for multiple PRACH transmissions. In the example of FIG. 9, the value of the PRACH mask index indicator field corresponds to a ROG index, or the ROG or the plurality of ROs corresponding to the value of the PRACH mask index indicator field are indicated by using the ROG index.

In an embodiment, the value of the PRACH mask index indicator field is used to indicate at least one ROG index that is forbidden to be used for multiple PRACH transmissions.

In an embodiment, the value of the PRACH mask index indicator field is used to indicate one ROG index that is forbidden to be used for multiple PRACH transmissions.

FIG. 10 shows still another example of an indication corresponding to a value of a PRACH mask index indication field. In the example of FIG. 10, among values of the PRACH mask index indicator field, a ROG (for example, one or more ROGs) or a plurality of ROs corresponding to a part of values are allowed to be used for multiple PRACH transmissions, and a ROG or a plurality of ROs corresponding to another part of values are forbidden to be used for multiple PRACH transmissions. In the example of FIG. 10, the value of the PRACH mask index indicator field corresponds to one or more of a ROG index, an RO index, and a number of ROs, or the ROG or the plurality of ROs corresponding to the value of the PRACH mask index indicator field are indicated by using one or more of the ROG index, the RO index, and the number of ROs.

In an embodiment, the value of the PRACH mask index indicator field is used to indicate one or more of a ROG index, an RO index, and a number of ROs that are allowed for multiple PRACH transmissions.

In an embodiment, the value of the PRACH mask index indicator field is used to indicate one or more of a ROG index, an RO index, and a number of ROs that are forbidden to be used for multiple PRACH transmissions.

It should be noted that FIG. 5 to FIG. 10 are merely examples listed for ease of understanding, and other combinations are not listed for brevity. Actually, an indication corresponding to the value of the PRACH mask index indicator field may be indicated by any combination of one or more of a ROG index, an RO index, and a number of ROs. In addition, the indication corresponding to the value of the PRACH mask index indicator field may be allowed to be used for multiple PRACH transmissions; or may be forbidden to be used for multiple PRACH transmissions; or may be partially allowed to be used for multiple PRACH transmissions, and partially forbidden to be used for multiple PRACH transmissions.

It should be further noted that the values of the PRACH mask indicator field in FIG. 5 to FIG. 10 are merely examples, and are not intended to impose a limitation. The values of the PRACH mask indicator field in the present application are merely listed values as examples. In addition, in FIG. 5 to FIG. 10, non-negative integers 0 to 15 are used to indicate the values of the PRACH mask index indicator field, but embodiments of the present application are not limited thereto. For example, non-negative integers 0 to 31 may be used to indicate the values.

The method for a first node used for wireless communication according to the embodiment of the present application is described above from the perspective of a first node with reference to FIG. 2 to FIG. 10. A method for a second node used for wireless communication according to an embodiment of the present application is described below from the perspective of a second node with reference to FIG. 11. It should be understood that descriptions of the first node and the second node correspond to each other, and therefore, for a part that is not described in detail, reference may be made to the foregoing descriptions.

In an embodiment, the second node may be a node that transmits first signaling and/or second signaling in a communication system.

In an embodiment, the second node may be a base station.

In an embodiment, the second node may include one or more transmitting sets. For example, the second node may include a first transmitting set and a second transmitting set.

In an embodiment, the second node may include a first receiving set.

Figure 11:
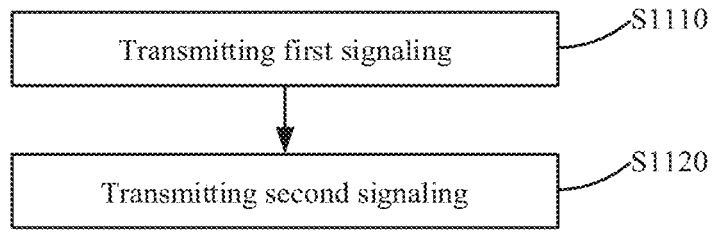
FIG. 11 is a schematic flowchart of a method for a second node used for wireless communication according to an embodiment of the present application.

FIG. 11 is a schematic flowchart of a method for a second node used for wireless communication according to an embodiment of the present application. The method shown in FIG. 11 may include step S1110 and step S1120.

In step S1110, first signaling is transmitted.

In an embodiment, the first signaling is used to determine a plurality of ROGs, and each of the plurality of ROGs includes a plurality of ROs.

In step S1120, second signaling is transmitted.

In an embodiment, the second signaling is used to indicate a value of a first index, and the value of the first index corresponds to at least one ROG of the plurality of ROGs.

In an embodiment, the method further includes: receiving a plurality of PRACHs. The plurality of PRACHs are transmitted on a target ROG, and the target ROG is one of the at least one ROG corresponding to the value of the first index.

In an embodiment, the method further includes: receiving a plurality of PRACHs. The plurality of PRACHs are transmitted on a target ROG, and the target ROG is a ROG, other than the at least one ROG corresponding to the value of the first index, in the plurality of ROGs determined by the first signaling.

In an embodiment, the value of the first index is one of a plurality of non-negative integers, and the plurality of non-negative integers are in a one-to-one correspondence with a plurality of physical random access channel occasion group subsets; and each of the plurality of physical random access channel occasion group subsets includes at least one physical random access channel occasion group of the plurality of physical random access channel occasion groups.

In an embodiment, at least one physical random access channel occasion group included in at least one physical random access channel occasion group subset of the plurality of physical random access channel occasion group subsets is allowed to be used for multiple physical random access channel transmissions.

In an embodiment, at least one physical random access channel occasion group included in at least one physical random access channel occasion group subset of the plurality of physical random access channel occasion group subsets is forbidden to be used for multiple physical random access channel transmissions.

In an embodiment, third signaling is used to configure a correspondence between the plurality of non-negative integers and the plurality of physical random access channel occasion group subsets.

In an embodiment, the at least one physical random access channel occasion group corresponding to the value of the first index is associated with a same synchronization signal/physical broadcast channel block index.

In an embodiment, the value of the first index corresponds to a first physical random access channel occasion group index, and the first physical random access channel occasion group index is used to determine a first physical random access channel occasion group from the plurality of physical random access channel occasion groups.

In an embodiment, the value of the first index corresponds to a first occasion number, and a number of physical random access channel occasions included in at least one physical random access channel occasion group of the plurality of physical random access channel occasion groups is equal to the first occasion number.

In an embodiment, the value of the first index corresponds to a first physical random access channel occasion index, the first physical random access channel occasion index is used to determine a first physical random access channel occasion from a plurality of physical random access channel occasions included in the plurality of physical random access channel occasion groups, and each of the plurality of physical random access channel occasions included in the plurality of physical random access channel occasion groups belongs to one of the plurality of physical random access channel occasion groups.

In an embodiment, the second signaling includes a plurality of indication fields, and at least one of the plurality of indication fields is used to indicate the value of the first index.

In an embodiment, the plurality of indication fields include at least two of following: an uplink/supplementary uplink indication field, a synchronization signal/physical broadcast channel block index field, a first index field, and a reserved bits field; where the first index field is used to indicate at least one physical random access channel occasion group of the plurality of physical random access channel occasion groups; or the synchronization signal/physical broadcast channel block index field and the first index field are jointly used to indicate at least one physical random access channel occasion group of the plurality of physical random access channel occasion groups.

The method embodiments of the present application are described in detail above with reference to FIG. 1 to FIG. 11. Apparatus embodiments of the present application are described in detail below with reference to FIG. 12 and FIG. 15. It should be understood that the description of the method embodiments corresponds to the description of the apparatus embodiments, and therefore, for a part that is not described in detail, reference may be made to the foregoing method embodiments.

Figure 12:
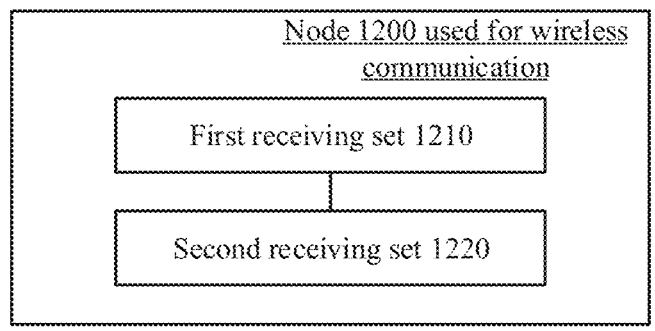
FIG. 12 is a schematic structural diagram of a node used for wireless communication according to an embodiment of the present application.

FIG. 12 is a schematic structural diagram of a node used for wireless communication according to an embodiment of the present application. A node 1200 shown in FIG. 12 may be any first node described above. The node 1200 may include a first receiving set 1210 and a second receiving set 1220.

The first receiving set 1210 may be configured to receive first signaling, where the first signaling is used to determine a plurality of physical random access channel occasion groups, and each of the plurality of physical random access channel occasion groups includes a plurality of physical random access channel occasions.

The second receiving set 1220 may be configured to receive second signaling, where the second signaling is used to indicate a value of a first index, and the value of the first index corresponds to at least one physical random access channel occasion group of the plurality of physical random access channel occasion groups.

In an embodiment, the node 1200 may include a first transmitting set, transmitting a plurality of physical random access channels on a target physical random access channel occasion group; where the target physical random access channel occasion group is one of the at least one physical random access channel occasion group corresponding to the value of the first index.

In an embodiment, the node 1200 may include a first transmitting set, transmitting a plurality of physical random access channels on a target physical random access channel occasion group; where the target physical random access channel occasion group is a physical random access channel occasion group, other than the at least one physical random access channel occasion group corresponding to the value of the first index, in the plurality of physical random access channel occasion groups determined by the first signaling.

In an embodiment, the value of the first index is one of a plurality of non-negative integers, and the plurality of non-negative integers are in a one-to-one correspondence with a plurality of physical random access channel occasion group subsets; and each of the plurality of physical random access channel occasion group subsets includes at least one physical random access channel occasion group of the plurality of physical random access channel occasion groups.

In an embodiment, at least one physical random access channel occasion group included in at least one physical random access channel occasion group subset of the plurality of physical random access channel occasion group subsets is allowed to be used for multiple physical random access channel transmissions.

In an embodiment, at least one physical random access channel occasion group included in at least one physical random access channel occasion group subset of the plurality of physical random access channel occasion group subsets is forbidden to be used for multiple physical random access channel transmissions.

In an embodiment, third signaling is used to configure a correspondence between the plurality of non-negative integers and the plurality of physical random access channel occasion group subsets.

In an embodiment, the at least one physical random access channel occasion group corresponding to the value of the first index is associated with a same synchronization signal/physical broadcast channel block index.

In an embodiment, the value of the first index corresponds to a first physical random access channel occasion group index, and the first physical random access channel occasion group index is used to determine a first physical random access channel occasion group from the plurality of physical random access channel occasion groups.

In an embodiment, the value of the first index corresponds to a first occasion number, and a number of physical random access channel occasions included in at least one physical random access channel occasion group of the plurality of physical random access channel occasion groups is equal to the first occasion number.

In an embodiment, the value of the first index corresponds to a first physical random access channel occasion index, the first physical random access channel occasion index is used to determine a first physical random access channel occasion from a plurality of physical random access channel occasions included in the plurality of physical random access channel occasion groups, and each of the plurality of physical random access channel occasions included in the plurality of physical random access channel occasion groups belongs to one of the plurality of physical random access channel occasion groups.

In an embodiment, the second signaling includes a plurality of indication fields, and at least one of the plurality of indication fields is used to indicate the value of the first index.

In an embodiment, the plurality of indication fields include at least two of following: an uplink/supplementary uplink indication field, a synchronization signal/physical broadcast channel block index field, a first index field, and a reserved bits field; where the first index field is used to indicate at least one physical random access channel occasion group of the plurality of physical random access channel occasion groups; or the synchronization signal/physical broadcast channel block index field and the first index field are jointly used to indicate at least one physical random access channel occasion group of the plurality of physical random access channel occasion groups.

Figure 14:
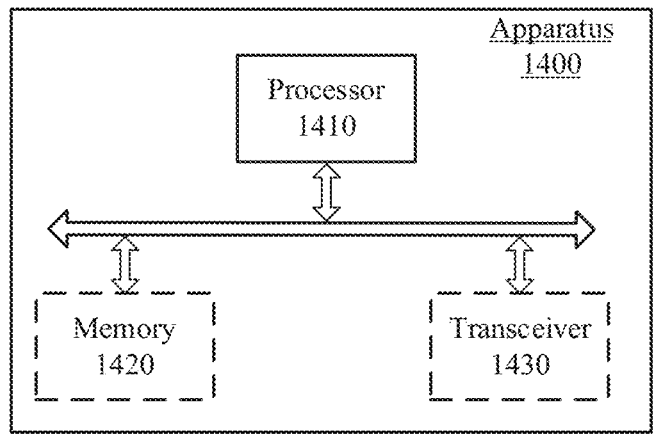
FIG. 14 is a schematic structural diagram of an apparatus according to an embodiment of the present application.

In an embodiment, the first receiving set 1210 and the second receiving set 1220 may be a transceiver 1430. The first node 1200 may further include a processor 1410 and a memory 1420. Details are shown in FIG. 14.

Figure 13:
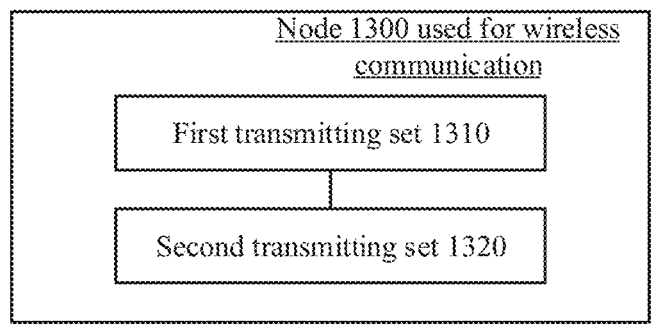
FIG. 13 is a schematic structural diagram of a node used for wireless communication according to another embodiment of the present application.

FIG. 13 is a schematic structural diagram of a node used for wireless communication according to another embodiment of the present application. A node 1300 shown in FIG. 13 may be any second node described above. The node 1300 may include a first transmitting set 1310 and a second transmitting set 1320.

The first transmitting set 1310 may be configured to transmit first signaling, where the first signaling is used to determine a plurality of physical random access channel occasion groups, and each of the plurality of physical random access channel occasion groups includes a plurality of physical random access channel occasions.

The second transmitting set 1320 may be configured to transmit second signaling, where the second signaling is used to indicate a value of a first index, and the value of the first index corresponds to at least one physical random access channel occasion group of the plurality of physical random access channel occasion groups.

In an embodiment, the node 1300 may further include a first receiving set, receiving a plurality of physical random access channels, where the plurality of physical random access channels are transmitted on a target physical random access channel occasion group; where the target physical random access channel occasion group is one of the at least one physical random access channel occasion group corresponding to the value of the first index.

In an embodiment, the node 1300 may further include a first receiving set, receiving a plurality of physical random access channels, where the plurality of physical random access channels are transmitted on a target physical random access channel occasion group; where the target physical random access channel occasion group is a physical random access channel occasion group, other than the at least one physical random access channel occasion group corresponding to the value of the first index, in the plurality of physical random access channel occasion groups determined by the first signaling.

In an embodiment, the value of the first index is one of a plurality of non-negative integers, and the plurality of non-negative integers are in a one-to-one correspondence with a plurality of physical random access channel occasion group subsets; and each of the plurality of physical random access channel occasion group subsets includes at least one physical random access channel occasion group of the plurality of physical random access channel occasion groups.

In an embodiment, at least one physical random access channel occasion group included in at least one physical random access channel occasion group subset of the plurality of physical random access channel occasion group subsets is allowed to be used for multiple physical random access channel transmissions.

In an embodiment, at least one physical random access channel occasion group included in at least one physical random access channel occasion group subset of the plurality of physical random access channel occasion group subsets is forbidden to be used for multiple physical random access channel transmissions.

In an embodiment, third signaling is used to configure a correspondence between the plurality of non-negative integers and the plurality of physical random access channel occasion group subsets.

In an embodiment, the at least one physical random access channel occasion group corresponding to the value of the first index is associated with a same synchronization signal/physical broadcast channel block index.

In an embodiment, the value of the first index corresponds to a first physical random access channel occasion group index, and the first physical random access channel occasion group index is used to determine a first physical random access channel occasion group from the plurality of physical random access channel occasion groups.

In an embodiment, the value of the first index corresponds to a first occasion number, and a number of physical random access channel occasions included in at least one physical random access channel occasion group of the plurality of physical random access channel occasion groups is equal to the first occasion number.

In an embodiment, the value of the first index corresponds to a first physical random access channel occasion index, the first physical random access channel occasion index is used to determine a first physical random access channel occasion from a plurality of physical random access channel occasions included in the plurality of physical random access channel occasion groups, and each of the plurality of physical random access channel occasions included in the plurality of physical random access channel occasion groups belongs to one of the plurality of physical random access channel occasion groups.

In an embodiment, the second signaling includes a plurality of indication fields, and at least one of the plurality of indication fields is used to indicate the value of the first index.

In an embodiment, the plurality of indication fields include at least two of following: an uplink/supplementary uplink indication field, a synchronization signal/physical broadcast channel block index field, a first index field, and a reserved bits field; where the first index field is used to indicate at least one physical random access channel occasion group of the plurality of physical random access channel occasion groups; or the synchronization signal/ physical broadcast channel block index field and the first index field are jointly used to indicate at least one physical random access channel occasion group of the plurality of physical random access channel occasion groups.

In an embodiment, the first transmitting set 1310 and the second transmitting set 1320 may be a transceiver 1430. The second node 1300 may further include a processor 1410 and a memory 1420. Details are shown in FIG. 14.

FIG. 14 is a schematic structural diagram of a communication apparatus according to an embodiment of the present application. The dashed lines in FIG. 14 indicate that the unit or module is optional. The apparatus 1400 may be configured to implement the methods described in the foregoing method embodiments. The apparatus 1400 may be a chip, a user equipment, or a network device.

The apparatus 1400 may include one or more processors 1410. The processor 1410 may allow the apparatus 1400 to implement the methods described in the foregoing method embodiments. The processor 1410 may be a general-purpose processor or a dedicated processor. For example, the processor may be a central processing unit (CPU). Alternatively, the processor may be another general-purpose processor, a digital signal processor (DSP), an application-specific integrated circuit (ASIC), a field-programmable gate array (FPGA) or another programmable logic device, a discrete gate or transistor logic device, a discrete hardware component, or the like. The general-purpose processor may be a microprocessor, or the processor may be any conventional processor or the like.

The apparatus 1400 may further include one or more memories 1420. The memory 1420 stores a program that may be executed by the processor 1410, so that the processor 1410 performs the method described in the foregoing method embodiments. The memory 1420 may be independent of the processor 1410 or may be integrated into the processor 1410.

The apparatus 1400 may further include a transceiver 1430. The processor 1410 may communicate with another device or chip through the transceiver 1430. For example, the processor 1410 may transmit data to and receive data from another device or chip by using the transceiver 1430.

Figure 15:
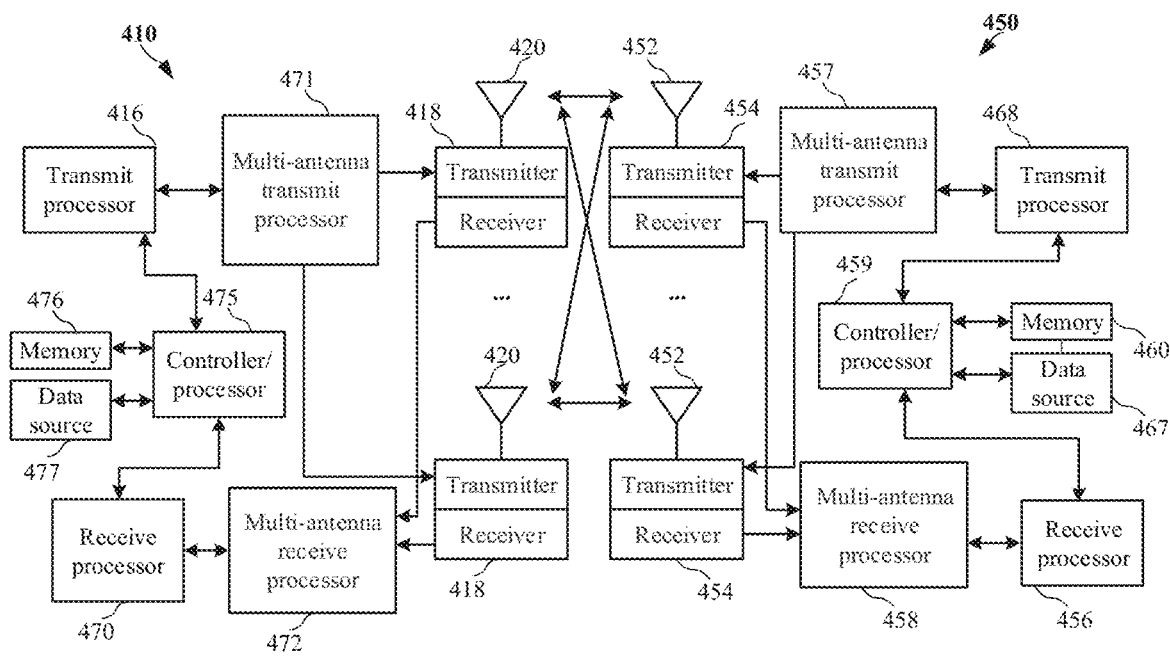
FIG. 15 is a schematic diagram of hardware modules of a communication device according to an embodiment of the present application.

FIG. 15 is a schematic diagram of hardware modules of a communication device according to an embodiment of the present application. Specifically, FIG. 15 is a block diagram of a first communication device 450 and a second communication device 410 communicating with each other in an access network.

The first communication device 450 includes a controller/processor 459, a memory 460, a data source 467, a transmit processor 468, a receive processor 456, a multi-antenna transmit processor 457, a multi-antenna receive processor 458, transmitters/receivers 454, and antennas 452.

The second communication device 410 includes a controller/processor 475, a memory 476, a data source 477, a receive processor 470, a transmit processor 416, a multi-antenna receive processor 472, a multi-antenna transmit processor 471, transmitters/receivers 418, and antennas 420.

During transmission from the second communication device 410 to the first communication device 450, at the second communication device 410, an upper layer data packet from a core network or an upper layer data packet from the data source 477 is provided to the controller/ processor 475. The core network and the data source 477 represent all protocol layers above an L2 layer. The controller/processor 475 implements a function of the L2 layer. During transmission from the second communication device 410 to the first communication device 450, the controller/ processor 475 provides header compression, encryption, packet segmentation and reordering, multiplexing between a logical channel and a transport channel, and allocation of radio resources of the first communication device 450 based on various priority measurements. The controller/processor 475 is further responsible for retransmission of a lost packet, and signaling to the first communication device 450. The transmit processor 416 and the multi-antenna transmit processor 471 implement various signal processing functions of an L1 layer (namely, a physical layer). The transmit processor 416 implements encoding and interleaving to facilitate forward error correction at the second communication device 410, and mapping of signal clusters based on various modulation schemes (such as binary phase shift keying, quadrature phase shift keying, M-phase shift keying, and M-quadrature amplitude modulation). The multi-antenna transmit processor 471 performs digital space precoding, including codebook-based precoding and non-codebook-based precoding, on a coded and modulated symbol, and beamforming processing, to generate one or more spatial streams. The transmit processor 416 then maps each spatial stream to a subcarrier, multiplexes the mapped spatial stream with a reference signal (for example, a pilot) in time domain and/or frequency domain, and then uses an inverse fast Fourier transform to generate a physical channel that carries a time-domain multi-carrier symbol stream. Subsequently, the multi-antenna transmit processor 471 performs an operation of analog precoding transmitting/beamforming on the time-domain multi-carrier symbol stream. Each transmitter 418 converts a baseband multi-carrier symbol stream provided by the multi-antenna transmit processor 471 into a radio frequency stream, and then provides the radio frequency stream for different antennas 420.

During transmission from the second communication device 410 to the first communication device 450, at the first communication device 450, each receiver 454 receives a signal through a corresponding antenna 452 of the receiver 454. Each receiver 454 recovers information modulated onto a radio frequency carrier, converts a radio frequency stream into a baseband multi-carrier symbol stream, and provides the baseband multi-carrier symbol stream for the receive processor 456. The receive processor 456 and the multi-antenna receive processor 458 implement various signal processing functions of the L1 layer. The multi-antenna receive processor 458 performs an operation of analog precoding receiving/beamforming on the baseband multi-carrier symbol stream from the receiver 454. The receive processor 456 converts, from time domain to frequency domain via fast Fourier transform, the baseband multi-carrier symbol stream obtained after the operation of analog precoding receiving/beamforming. In frequency domain, a physical-layer data signal and a reference signal are demultiplexed by the receive processor 456. The reference signal is used for channel estimation; and the data signal is recovered after multi-antenna detection performed by the multi-antenna receive processor 458, to obtain any spatial stream that uses the first communication device 450 as a destination. Symbols on each spatial stream are demodulated and recovered in the receive processor 456, and a soft decision is generated. The receive processor 456 then decodes and de-interleaves the soft decision to recover upper layer data and a control signal transmitted by the second communication device 410 on a physical channel. The upper layer data and the control signal are then provided to the controller/ processor 459. The controller/processor 459 implements functions of the L2 layer. The controller/processor 459 may be associated with a memory 460 that stores program code and data. The memory 460 may be referred to as a computer-readable medium. During transmission from the second communication device 410 to the first communication device 450, the controller/processor 459 provides demultiplexing between a transport channel and a logical channel, packet reassembly, decryption, header decompression, and control signal processing, to recover an upper layer data packet from the second communication device 410. The upper layer packet is then provided to all protocol layers above the L2 layer, or various control signals may be provided to the L3 layer for processing by the L3 layer.

During transmission from the first communication device 450 to the second communication device 410, at the first communication device 450, an upper layer data packet is provided to the controller/processor 459 by using the data source 467. The data source 467 represents all protocol layers above the L2 layer. Similar to the transmit function, at the second communication device 410, described during the transmission from the second communication device 410 to the first communication device 450, the controller/processor 459 implements header compression, encryption, packet segmentation and reordering, and multiplexing between a logical channel and a transport channel, to implement an L2 layer function for a user plane and a control plane. The controller/processor 459 is further responsible for retransmission of a lost packet, and signaling to the second communication device 410. The transmit processor 468 performs modulation mapping and channel coding processing, and the multi-antenna transmit processor 457 performs digital multi-antenna spatial precoding, including codebook-based precoding and non-codebook-based precoding, and beam forming processing. Then the transmit processor 468 modulates a generated spatial stream into a multi-carrier/single-carrier symbol stream, and the multi-carrier/single-carrier symbol stream is provided to different antennas 452 by using the transmitter 454 after undergoing an analog precoding/beamforming operation in the multi-antenna transmit processor 457. Each transmitter 454 first converts a baseband symbol stream provided by the multi-antenna transmit processor 457 into a radio frequency symbol stream, and then provides the radio frequency symbol stream for the antenna 452.

During transmission from the first communication device 450 to the second communication device 410, a function at the second communication device 410 is similar to the receive function, at the first communication device 450, described during the transmission from the second communication device 410 to the first communication device 450. Each receiver 418 receives a radio frequency signal through a corresponding antenna 420 of the receiver 418, converts the received radio frequency signal into a baseband signal, and provides the baseband signal for the multi-antenna receive processor 472 and the receive processor 470. The receive processor 470 and the multi-antenna receive processor 472 jointly implement functions of the L1 layer. The controller/processor 475 implements functions of the L2 layer. The controller/processor 475 may be associated with a memory 476 that stores program code and data. The memory 476 may be referred to as a computer-readable medium. During transmission from the first communication device 450 to the second communication device 410, the controller/processor 475 provides demultiplexing between a transport channel and a logical channel, packet reassembly, decryption, header decompression, and control signal processing, to recover an upper layer data packet from the first communication device 450. The upper layer data packet from the controller/processor 475 may be provided to a core network or all protocol layers above the L2 layer, or various control signals may be provided to the core network or the L3 layer for processing by the L3 layer.

In an embodiment, the first communication device 450 includes least one processor and at least one memory. The at least one memory includes computer program code. The at least one memory and the computer program code are configured to be used together with the at least one processor. The first communication device 450 is at least configured to: receive first signaling, where the first signaling is used to determine a plurality of physical random access channel occasion groups, and any physical random access channel occasion group of the plurality of physical random access channel occasion groups includes a plurality of physical random access channel occasions; and receive second signaling, where the second signaling is used to indicate a value of a first index, and the value of the first index corresponds to at least one physical random access channel occasion group of the plurality of physical random access channel occasion groups.

In an embodiment, the first communication device 450 includes: a memory storing a program of computer-readable instructions. When executed by at least one processor, the program of computer-readable instructions generates actions, where the actions include: receiving first signaling, where the first signaling is used to determine a plurality of physical random access channel occasion groups, and any physical random access channel occasion group of the plurality of physical random access channel occasion groups includes a plurality of physical random access channel occasions; and receiving second signaling, where the second signaling is used to indicate a value of a first index, and the value of the first index corresponds to at least one physical random access channel occasion group of the plurality of physical random access channel occasion groups.

In an embodiment, the first communication device 450 corresponds to the first node in the present application.

In an embodiment, the second communication device 410 corresponds to the second node in the present application.

In an embodiment, the first communication device 450 is an NCR.

In an embodiment, the first communication device 450 is a user equipment.

In an embodiment, the first communication device 450 is a user equipment that supports V2X.

In an embodiment, the first communication device 450 is a user equipment that supports D2D.

In an embodiment, the second communication device 410 is a base station.

In an embodiment, the antenna 452, the receiver 454, the multi-antenna receive processor 458, the receive processor 456, and the controller/processor 459 are configured to receive the first signaling and/or the second signaling in the present application.

In an embodiment, the antenna 420, the transmitter 418, the multi-antenna transmit processor 471, the transmit processor 416, and the controller/processor 475 are configured to transmit the first signaling and/or the second signaling in the present application.

In an embodiment, the antenna 452, the transmitter 454, the multi-antenna transmit processor 457, the transmit processor 468, and the controller/processor 459 are configured to transmit a plurality of PRACHs in the present application.

In an embodiment, the antenna 420, the receiver 418, the multi-antenna receive processor 472, the receive processor 470, and the controller/processor 475 are configured to receive a plurality of PRACHs in the present application.

An embodiment of the present application further provides a computer-readable storage medium for storing a program. The computer-readable storage medium may be applied to the terminal or the network device provided in embodiments of the present application, and the program causes a computer to perform the methods performed by the terminal or the network device in various embodiments of the present application.

An embodiment of the present application further provides a computer program product. The computer program product includes a program. The computer program product may be applied to the terminal or the network device provided in embodiments of the present application, and the program causes a computer to perform the methods performed by the terminal or the network device in various embodiments of the present application.

An embodiment of the present application further provides a computer program. The computer program may be applied to the terminal or the network device provided in embodiments of the present application, and the computer program causes a computer to perform the methods performed by the terminal or the network device in various embodiments of the present application.

It should be understood that the terms "system" and "network" in the present application may be used interchangeably. In addition, the terms used in the present application are only used to explain the specific embodiments of the present application, and are not intended to limit the present application. The terms "first", "second", "third", "fourth", and the like in the specification, claims, and drawings of the present application are used to distinguish between different objects, rather than to describe a specific order. In addition, the terms "include" and "have" and any variations thereof are intended to cover a non-exclusive inclusion.

In embodiments of the present application, "indicate" mentioned herein may refer to a direct indication, or may refer to an indirect indication, or may mean that there is an association relationship. For example, A indicates B, which may mean that A directly indicates B, for example, B may be obtained by means of A; or may mean that A indirectly indicates B, for example, A indicates C, and B may be obtained by means of C; or may mean that there is an association relationship between A and B.

In embodiments of the present application, "B corresponding to A" means that B is associated with A, and B may be determined based on A. However, it should also be understood that, determining B based on A does not mean determining B based only on A, but instead B may be determined based on A and/or other information.

In embodiments of the present application, the term "correspond" may mean that there is a direct or indirect correspondence between the two, or may mean that there is an association relationship between the two, or may mean that there is a relationship such as indicating and being indicated, or configuring and being configured.

In embodiments of the present application, "predefined" or "preconfigured" may be implemented by pre-storing corresponding code, tables, or other forms that may be used to indicate related information in devices (for example, including a user equipment and a network device), and a specific implementation thereof is not limited in the present application. For example, being pre-defined may refer to being defined in a protocol.

In embodiments of the present application, the "protocol" may refer to a standard protocol in the communications field, and may include, for example, an LTE protocol, an NR protocol, and a related protocol applied to a future communication system, which is not limited in the present application.

In embodiments of the present application, the term "and/or" is merely an association relationship that describes associated objects, and represents that there may be three relationships. For example, A and/or B may represent three cases: only A exists, both A and B exist, and only B exists. In addition, the character "/" in the specification generally indicates an "or" relationship between the associated objects.

In embodiments of the present application, sequence numbers of the foregoing processes do not mean execution sequences. The execution sequences of the processes should be determined according to functions and internal logic of the processes, and should not be construed as any limitation on the implementation processes of embodiments of the present application.

In several embodiments provided in the present application, it should be understood that, the disclosed system, apparatus, and method may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatus or units may be implemented in electronic, mechanical, or other forms.

The units described as separate components may be or may not be physically separated, and the components displayed as units may be or may not be physical units, that is, may be located in one place or distributed on a plurality of network units. Some or all of the units may be selected according to actual requirements to achieve the objectives of the solutions of the embodiments.

In addition, functional units in embodiments of the present application may be integrated into one processing unit, or each of the units may exist alone physically, or two or more units may be integrated into one unit.

All or some of the foregoing embodiments may be implemented by using software, hardware, firmware, or any combination thereof. When software is used to implement embodiments, the foregoing embodiments may be implemented completely or partially in a form of a computer program product. The computer program product includes one or more computer instructions. When the computer program instructions are loaded and executed on a computer, the procedures or functions according to embodiments of the present application are completely or partially generated. The computer may be a general-purpose computer, a dedicated computer, a computer network, or another programmable apparatus. The computer instructions may be stored in a computer-readable storage medium or transmitted from one computer-readable storage medium to another computer-readable storage medium. For example, the computer instructions may be transmitted from a website, computer, server, or data center to another website, computer, server, or data center in a wired (such as a coaxial cable, an optical fiber, and a digital subscriber line (DSL)) manner or a wireless (such as infrared, wireless, and microwave) manner. The computer-readable storage medium may be any usable medium readable by the computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, a solid state drive (SSD)), or the like.

The foregoing descriptions are merely specific implementations of the present application, but the protection scope of the present application is not limited thereto. Any variation or replacement readily figured out by a person skilled in the art within the technical scope disclosed in the present application shall fall within the protection scope of the present application. Therefore, the protection scope of the present application shall be subject to the protection scope of the claims.

What is claimed is:

1. A first node, comprising:
at least one processor; and
one or more memories coupled to the at least one processor and storing programming instructions for execution by the at least one processor to cause the first node to perform operations comprise:
receiving first signaling, wherein the first signaling indicates a plurality of physical random access channel occasion groups, and each of the plurality of physical random access channel occasion groups comprises a plurality of physical random access channel occasions; and
receiving second signaling, wherein the second signaling indicates a value of a first index, and the value of the first index corresponds to at least one corresponding physical random access channel occasion group of the plurality of physical random access channel occasion groups, wherein the value of the first index corresponds to a first physical random access channel occasion index, the first physical random access channel occasion index indicates a first physical random access channel occasion, and a first physical random access channel occasion group is indicated by the first physical random access channel occasion and a first occasion number, wherein the first occasion number is a corresponding number of {2, 4, 8}.

2. The first node according to claim 1, wherein the operations comprise:
transmitting a plurality of random access preambles on a first physical random access channel occasion group;
wherein the first physical random access channel occasion group is one of the at least one corresponding physical random access channel occasion group corresponding to the value of the first index.

3. The first node according to claim 1, wherein the operations comprise:
transmitting a plurality of random access preambles on a first physical random access channel occasion group;
wherein the first physical random access channel occasion group is a physical random access channel occasion group, other than the at least one corresponding physical random access channel occasion group corresponding to the value of the first index, in the plurality of physical random access channel occasion groups determined by the first signaling.

4. The first node according to claim 1, wherein the value of the first index is one of a plurality of non-negative integers, and the plurality of non-negative integers are corresponding to a plurality of physical random access channel occasion group subsets; and each of the plurality of physical random access channel occasion group subsets comprises at least one physical random access channel occasion group of the plurality of physical random access channel occasion groups.

5. The first node according to claim 4, wherein at least one physical random access channel occasion group comprised in at least one physical random access channel occasion group subset of the plurality of physical random access channel occasion group subsets is allowed to be used for transmitting a plurality of random access preambles.

6. The first node according to claim 4, wherein at least one physical random access channel occasion group comprised in at least one physical random access channel occasion group subset of the plurality of physical random access channel occasion group subsets is forbidden to be used for transmitting a plurality of random access preambles.

7. The first node according to claim 4, wherein the operations comprise:
obtaining a configuration of a correspondence between the plurality of non-negative integers and the plurality of physical random access channel occasion group subsets.

8. The first node according to claim 7, wherein the configuration is obtained through radio resource control (RRC) layer signaling.

9. The first node according to claim 1, wherein the at least one corresponding physical random access channel occasion group corresponding to the value of the first index is associated with a same synchronization signal/physical broadcast channel (SS/PBCH) block index.

10. The first node according to claim 1, wherein the second signaling comprises a plurality of indication fields, at least one of the plurality of indication fields indicate the value of the first index, and the second signaling comprises a higher-layer signaling or downlink control information (DCI) format 1_0.

11. The first node according to claim 10, wherein the second signaling is DCI format 1_0, the plurality of indication fields comprise at least two of following: an uplink/supplementary uplink (UL/SUL) indication field, a SS/PBCH block index field, a first index field, and a reserved bits field; and the first index field is physical random access channel mask index field.

12. A second node, comprising:
at least one processor; and
one or more memories coupled to the at least one processor and storing programming instructions for execution by the at least one processor to cause the second node to perform operations comprise:
transmitting first signaling, wherein the first signaling indicates a plurality of physical random access channel occasion groups, and each of the plurality of physical random access channel occasion groups comprises a plurality of physical random access channel occasions; and
transmitting second signaling, wherein the second signaling indicates a value of a first index, and the value of the first index corresponds to at least one corresponding physical random access channel occasion group of the plurality of physical random access channel occasion groups, wherein the value of the first index corresponds to a first physical random access channel occasion index, the first physical random access channel occasion index indicates a first physical random access channel occasion, and a first physical random access channel occasion group is indicated by the first physical random access channel occasion and a first occasion number, wherein the first occasion number is a corresponding number of {2, 4, 8}.

13. The second node according to claim 12, wherein the operations comprise:
receiving a plurality of random access preambles, wherein the plurality of random access preambles are transmitted on a first physical random access channel occasion group;
wherein the first physical random access channel occasion group is one of the at least one corresponding physical random access channel occasion group corresponding to the value of the first index.

14. The second node according to claim 12, wherein the operations comprise:
receiving a plurality of random access preambles, wherein the plurality of random access preambles are transmitted on a first physical random access channel occasion group;
wherein the first physical random access channel occasion group is a physical random access channel occasion group, other than the at least one corresponding physical random access channel occasion group corresponding to the value of the first index, in the plurality of physical random access channel occasion groups determined by the first signaling.

15. The second node according to claim 12, wherein the value of the first index is one of a plurality of non-negative integers, and the plurality of non-negative integers are corresponding to a plurality of physical random access channel occasion group subsets; and each of the plurality of physical random access channel occasion group subsets comprises at least one physical random access channel occasion group of the plurality of physical random access channel occasion groups.

16. A method, comprising:
receiving, by a first node, first signaling, wherein the first signaling indicates a plurality of physical random access channel occasion groups, and each of the plurality of physical random access channel occasion groups comprises a plurality of physical random access channel occasions; and
receiving, by the first node, second signaling, wherein the second signaling indicates a value of a first index, and the value of the first index corresponds to at least one corresponding physical random access channel occasion group of the plurality of physical random access channel occasion groups, wherein the value of the first index corresponds to a first physical random access channel occasion index, the first physical random access channel occasion index indicates a first physical random access channel occasion, and a first physical random access channel occasion group is indicated by the first physical random access channel occasion and a first occasion number, wherein the first occasion number is a corresponding number of {2, 4, 8}.

17. The method according to claim 16, wherein the method comprises:
transmitting a plurality of random access preambles on a first physical random access channel occasion group;
wherein the first physical random access channel occasion group is one of the at least one corresponding physical random access channel occasion group corresponding to the value of the first index.

18. The method according to claim 16, wherein the method comprise:
transmitting a plurality of random access preambles on a first physical random access channel occasion group;
wherein the first physical random access channel occasion group is a physical random access channel occasion group, other than the at least one corresponding physical random access channel occasion group corresponding to the value of the first index, in the plurality of physical random access channel occasion groups determined by the first signaling.

19. The method according to claim 16, wherein the value of the first index is one of a plurality of non-negative integers, and the plurality of non-negative integers are corresponding to a plurality of physical random access channel occasion group subsets; and each of the plurality of physical random access channel occasion group subsets comprises at least one physical random access channel occasion group of the plurality of physical random access channel occasion groups.

20. The method according to claim 16, wherein the at least one corresponding physical random access channel occasion group corresponding to the value of the first index is associated with a same synchronization signal/physical broadcast channel (SS/PBCH) block index.

\* \* \* \* \*